US012364985B2

(12) United States Patent
Civelekoglu et al.

(10) Patent No.: US 12,364,985 B2
(45) Date of Patent: Jul. 22, 2025

(54) SYSTEMS AND METHODS FOR ELECTRONIC SURFACE ANTIGEN EXPRESSION ANALYSIS USING MAGNETOPHORESIS

(71) Applicant: Georgia Tech Research Corporation, Atlanta, GA (US)

(72) Inventors: Ozgun Civelekoglu, Atlanta, GA (US); Ali Fatih Sarioglu, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 1217 days.

(21) Appl. No.: 17/054,695

(22) PCT Filed: May 10, 2019

(86) PCT No.: PCT/US2019/031730

§ 371 (c)(1),
(2) Date: Nov. 11, 2020

(87) PCT Pub. No.: WO2019/217823

PCT Pub. Date: Nov. 14, 2019

(65) Prior Publication Data

US 2021/0069713 A1 Mar. 11, 2021

Related U.S. Application Data

(60) Provisional application No. 62/767,341, filed on Nov. 14, 2018, provisional application No. 62/670,477, filed on May 11, 2018.

(51) Int. Cl.

| | |
|---|---|
| ***B01L 3/00*** | (2006.01) |
| ***B03C 1/01*** | (2006.01) |
| ***B03C 1/033*** | (2006.01) |
| ***B03C 1/28*** | (2006.01) |
| ***B03C 1/32*** | (2006.01) |

(52) U.S. Cl.

CPC ... *B01L 3/502776* (2013.01); *B01L 3/502761* (2013.01); *B03C 1/01* (2013.01); *B03C 1/0335* (2013.01); *B03C 1/288* (2013.01); *B03C 1/32* (2013.01); *B01L 2400/043* (2013.01); *B03C 2201/18* (2013.01)

(58) Field of Classification Search

CPC ......... B01L 3/502776; B01L 3/502761; B01L 2400/043; B01L 2200/0652; B01L 2200/148; B01L 2300/02; B01L 2300/0645; B01L 2300/0816; B01L 2300/0864; B01L 2300/0867; B01L 3/50273; B03C 1/01; B03C 1/0335; B03C 1/288; B03C 1/32; B03C 2201/18; B03C 2201/26

See application file for complete search history.

(56) References Cited

U.S. PATENT DOCUMENTS

2011/0014600 A1* 1/2011 Oh .................... B01L 3/502761
435/173.9

FOREIGN PATENT DOCUMENTS

| | | | |
|---|---|---|---|
| CA | 2626728 | * 5/2007 | ............. A61K 38/17 |
| KR | 20080063406 | * 7/2008 | ............... C12N 5/06 |
| WO | WO 2017070602 | * 4/2017 | ............. G01N 15/10 |
| WO | WO 2024243684 | * 12/2024 | ........... C12Q 1/6804 |

OTHER PUBLICATIONS

International Search Report and Written Opinion issued in PCT Application No. PCT/US2019/031730 dated Jul. 18, 2019.

Civelekoglu, O et al.: "A Microfluidic Device for Electronic Cell Surface Expression Profiling Using Magnetophoresis", Transducers, 2017, Kaohsiung, Taiwan, XP033130753.

* cited by examiner

*Primary Examiner* — Ann Montgomery

(74) *Attorney, Agent, or Firm* — Troutman Pepper Locke LLP; Ryan A. Schneider; Lauren G. Alvarez

(57) ABSTRACT

Embodiments of the present disclosure relate generally to systems and methods for sorting and analyzing cells and, more particularly, to systems and methods for sorting and analyzing cells using magnetophoresis in a microfluidic platform. Some embodiments of a microfluidic device comprise an inlet for receiving a plurality of magnetically-labeled cells, a flow chamber, a magnet positioned alongside the flow chamber, and a plurality of bins having a sensor for detecting the magnetically-labeled cells. In some embodiments, the magnetic flux of the magnet causes the magnetically-labeled cells to be deflected to a particular bin. The sensors of each bin can be used to calculate the surface antigen expression and/or size of the cells within a sample of magnetically-labeled cells.

20 Claims, 29 Drawing Sheets

| Code index | 31-bit Gold Code | Implementation |
|---|---|---|
| 1 | 1010111011000111110011010010000 | Bin 1 |
| 2 | 1011010100011101111100100110000 | Bin 2 |
| 3 | 0001101111011010001111110100000 | Bin 3 |
| 4 | 1110100010010010011010000010001 | |
| 5 | 0000111000000001011000110111001 0 | |
| 6 | 1100001100100011100110110110101 | Bin 4 |
| 7 | 0101100101100001001000000111010 | |
| 8 | 0110110111100100010101100100101 | |
| 9 | 0000010011101110101110100011011 | Bin 5 |
| 10 | 1101011011111011011000101100111 | |
| 11 | 0111001011010000110100110011110 | Bin 6 |
| 12 | 0011101010000111101100001101101 | |
| 13 | 1010101000101001011101110001011 | |
| 14 | 1000101101110100111110001000110 | |
| 15 | 1100100111001111111001111011100 | |
| 16 | 0100110010111001110110011101000 | Bin 7 |
| 17 | 0100011001010101101001010000001 | |
| 18 | 0101001110001101010111001010011 | |
| 19 | 0111100000111100101011111110111 | |
| 20 | 0010111101011111010010010111111 | |
| 21 | 1000000110011000100001000101111 | |
| 22 | 1101110000010111000111100001110 | |
| 23 | 0110011100001000001010101001100 | |
| 24 | 0001000100110110010000111001001 | |
| 25 | 1111110101001010100100011000011 | |
| 26 | 0010010110110011001101011010110 | |
| 27 | 1001010001000000001111011111101 | Bin 8 |
| 28 | 1111011110100110111011010101010 | |
| 29 | 0011000001101011110011000000100 | |
| 30 | 1011111111111000110001110101 1001 | |
| 31 | 1010000011000101000001011110001 0 | |
| 32 | 1001111010101100000000010010100 | |
| 33 | 1110001001111111000010100111100 0 | |

FIG. 5

SYSTEMS AND METHODS FOR ELECTRONIC SURFACE ANTIGEN EXPRESSION ANALYSIS USING MAGNETOPHORESIS

CROSS-REFERENCE TO RELATED APPLICATIONS

This Application claims priority, and benefit under 35 U.S.C. § 119(e), to U.S. Provisional Patent Application No. 62/670,477, filed 11 May 2018, and to U.S. Provisional Patent Application No. 62/767,341, filed 14 Nov. 2018. The disclosures of these prior applications are hereby incorporated by reference as if fully set forth below.

STATEMENT OF RIGHTS UNDER FEDERALLY SPONSORED RESEARCH

This invention was made with government support under Award Nos. 1610995 and 1752170 awarded by the National Science Foundation. The government has certain rights in this invention.

FIELD OF THE DISCLOSURE

Embodiments of the present disclosure relate generally to systems and methods for sorting and analyzing cells and, more particularly, to systems and methods for sorting and analyzing cells using magnetophoresis in a microfluidic platform.

BACKGROUND

Surface antigens are protein complexes on the cell membrane that regulate biochemical interactions of cells. Measurement of surface antigen expression levels is widely used in immunophenotyping, clinical diagnosis and prognosis, as well as in biomedical research. The current gold standard for analyzing suffice antigen expression is using flow cytometry.

Flow cytometry is an invaluable bioanalytical technique for high-throughput physical and/or chemical characterization of single cells, particularly for applications where single cell-level traits would be masked by population-level measurements. In flow cytometry, single cells suspended in a fluid stream are interrogated one by one through fluorescence measurements, from which cell subpopulations can be identified through gating and sorted into different outlets. Currently, flow cytometers are routinely used in laboratories for biomedical research as well as for clinical medicine in applications including protein engineering, drug screening, cell signaling analysis, immunophenotyping of blood cells to diagnose hematologic cancers and autoimmune or immunodeficiency syndromes (e.g., AIDS), pathogen detection, and histocompatibility testing of organ transplants.

Despite the established and appreciated utility of flow cytometers for sample analysis, high cost, operational complexity, and bulky instrumentation prevent their widespread adoption in resource-poor settings, where they can be highly useful to detect and monitor prevalent infectious diseases such as TB, malaria, and AIDS. From an instrumentation point of view, flow cytometers are complex instruments combining laser sources, precision optical elements, and high-speed electronic components. Even application-specific commercial flow cytometers stripped down to essentials remain fairly complex and cost several tens of thousands of dollars. Recent interest in microflow cytometry aims to utilize the advantages of microfluidic systems, namely portability and low-cost in flow cytometry. However, these systems, which are generally designed as scaled down versions of a conventional flow cytometer, remain fairly complex with limited practical point-of-care utility.

What is needed, therefore, is inexpensive systems and methods that allow quantification of surface antigen expression. Ideally, the systems and methods could also quantify cell size and, preferably, sort the cells based on their expression, size, or both, without the need for a separate gating process or manual separation.

SUMMARY

Embodiments of the present disclosure address these concerns as well as other needs that will become apparent upon reading the description below in conjunction with the drawings. Briefly described, embodiments of the present disclosure relate generally to systems and methods for sorting and analyzing cells and, more particularly, to systems and methods for sorting and analyzing cells using magnetophoresis detection in a microfluidic platform.

An exemplary embodiment of the present invention provides a microfluidic device. The microfluidic device can have a first inlet configured to receive a first fluid comprising a plurality of magnetically-labeled cells. The microfluidic device can have a first flow chamber having a first end and a second end, the first end in fluid communication with the first inlet. The microfluidic device can have a plurality of bins, each bin having a first end and a second end, the first end of each bin in fluid communication with the second end of the first flow chamber. The microfluidic device can have a first magnet disposed adjacent to the first flow chamber, the first magnet configured to attract the magnetically-labeled cells towards a bin of the plurality of bins. The microfluidic device can have a plurality of sensors. Each sensor can be disposed at the second end of a corresponding bin of the plurality of bins, and each sensor can be configured to produce a unique signal in response to a cell of the plurality of magnetically-labeled cells passing through the bin corresponding to the sensor.

In any of the embodiments described herein, each sensor can be configured to detect the magnetism of a cell of the plurality of magnetically-labeled cells.

In any of the embodiments described herein, each sensor can be coded with a multi-bit Gold sequence to produce the unique signal.

In any of the embodiments described herein, each sensor can comprise at least one positive electrode finger and at least one negative electrode finger. The microfluidic device can have a positive electrode in electrical communication with the positive electrode fingers and a negative electrode in electrical communication with the negative electrode fingers. Bits of the multi-bit Gold sequence of each sensor can be defined by alternating the at least one positive electrode finger and the at least one negative electrode finger.

In any of the embodiments described herein, the multi-bit Gold sequence can comprise at least 10 bits.

In any of the embodiments described herein, the unique signal of each sensor can include an amplitude corresponding to a size of a cell of the plurality of magnetically-labeled cells.

In any of the embodiments described herein, the unique signal of each sensor can include a signal duration corresponding to a flow rate of the first fluid.

In any of the embodiments described herein, the microfluidic device can have a second inlet to receive a second fluid, the second inlet in fluid communication with the first end of the first flow chamber.

In any of the embodiments described herein, the microfluidic device can have a second flow chamber disposed between the first inlet and the first flow chamber. The second flow chamber can have a first outlet and a second outlet, the first outlet exiting into the first flow chamber, and the second outlet not exiting into the first flow chamber. The microfluidic device can have a second magnet disposed adjacent to the second flow chamber between the first inlet and the first and second outlets of the second flow chamber.

In any of the embodiments described herein, the first fluid can further comprise a plurality of non-labeled cells, and the second magnet can be configured to separate the plurality magnetically-labeled cells from the plurality of non-labeled cells by diverting the plurality magnetically-labeled cells to the first outlet of the second flow chamber.

In any of the embodiments described herein, the first magnet can be an electromagnet. The microfluidic device can further comprise a controller configured to adjust a magnetic flux of the first magnet to alter an amount of attraction of the magnetically-labeled cells by the first magnet.

According to another embodiment of the present invention, a method is provided. The method can include providing a microfluidic device. The microfluidic device can have a first inlet configured to receive a first fluid comprising a plurality of magnetically-labeled cells. The microfluidic device can have a flow chamber having a first end and a second end, the first end in fluid communication with the first inlet. The microfluidic device can have a plurality of bins, each bin having a first end and a second end, the first end of each bin in fluid communication with the second end of the first flow chamber. The microfluidic device can have a magnet disposed adjacent to the flow chamber, and the magnet can be configured to attract the magnetically-labeled cells towards a bin of the plurality of bins. The microfluidic device can have a plurality of sensors, each sensor disposed at the second end of a corresponding bin in the plurality of bins. Each sensor can be configured to produce a unique signal in response to a cell of the plurality of magnetically-labeled cells passing through the bin corresponding to the sensor. The method can further include flowing the first fluid from the first inlet, through the flow chamber, and through the plurality of bins. The method can further include receiving the unique signal from a sensor of the plurality of sensors.

In any of the embodiments described herein, the method can include receiving a plurality of unique signals from the plurality of sensors, each unique signal corresponding to a cell in the plurality of magnetically-labeled cells, and calculating cellular data for the plurality of magnetically-labeled cells from the plurality of unique signals.

In any of the embodiments described herein, the unique signal of each sensor can include an amplitude corresponding to a size of a cell of the plurality of magnetically-labeled cells.

In any of the embodiments described herein, the unique signal of each sensor can include a signal duration corresponding to a flow rate of the first fluid.

In any of the embodiments described herein, each sensor can be configured to detect the magnetism of a cell of the plurality of magnetically-labeled cells.

In any of the embodiments described herein, each sensor can be coded with a multi-bit Gold sequence to produce the unique signal.

In any of the embodiments described herein, each sensor can comprise at least one positive electrode finger and at least one negative electrode finger. The microfluidic device can have a positive electrode in electrical communication with the positive electrode fingers and a negative electrode in electrical communication with the negative electrode fingers. Bits of the multi-bit Gold sequence of each sensor can be defined by alternating the at least one positive electrode finger and the at least one negative electrode finger.

In any of the embodiments described herein, the multi-bit Gold sequence can comprise at least 10 bits.

In any of the embodiments described herein, the method can include adjusting a flow rate of the first fluid to change an amount of attraction of the magnetically-labeled cells by the magnet.

In any of the embodiments described herein, the magnet can be an electromagnet. The microfluidic device can further include a controller configured to adjust a magnetic flux of the magnet to alter an amount of attraction of the magnetically-labeled cells by the magnet. The method can include adjusting, via the controller, the magnetic flux of the electromagnet.

According to another embodiment of the present invention, a microfluidic device is provided. The microfluidic device can include a first inlet configured to receive a first fluid comprising a plurality magnetically-labeled cells and a plurality of non-labeled cells. The microfluidic device can include a first flow chamber having a first outlet and a second outlet, the first fluid outlet exiting to a second flow chamber, and the second fluid outlet exiting to a removal channel. The microfluidic device can include a first magnet disposed adjacent to the first flow chamber, the first magnet configured to separate the plurality magnetically-labeled cells from the plurality of non-labeled cells by diverting the plurality magnetically-labeled cells to the first outlet. The microfluidic device can include a plurality of bins, each bin having a first end and a second end, the first end of each bin in fluid communication with the second flow chamber and disposed distal to the first fluid inlet. The microfluidic device can include a second magnet disposed adjacent to the second flow chamber, the second magnet configured to attract the magnetically-labeled cells towards a bin of the plurality of bins. The microfluidic device can include a plurality of sensors, each sensor disposed at the second end of a corresponding bin of the plurality of bins, each sensor configured to produce a unique signal in response to detecting a cell of the plurality of magnetically-labeled cells passing through the bin corresponding to the sensor.

In any of the embodiments described herein, each sensor can be configured to detect a magnetism of a cell of the plurality of magnetically-labeled cells.

In any of the embodiments described herein, each sensor can be coded with a multi-bit Gold sequence to produce the unique signal.

In any of the embodiments described herein, each sensor can comprise at least one positive electrode finger and at least one negative electrode finger. The microfluidic device can have a positive electrode in electrical communication with the positive electrode fingers and a negative electrode in electrical communication with the negative electrode fingers. Bits of the multi-bit Gold sequence of each sensor can be defined by alternating the at least one positive electrode finger and the at least one negative electrode finger.

In any of the embodiments described herein, the multi-bit Gold sequence can comprise at least 10 bits.

In any of the embodiments described herein, the unique signal of each sensor can include an amplitude corresponding to a size of a cell of the plurality of magnetically-labeled cells.

In any of the embodiments described herein, the unique signal of each sensor can include a signal duration corresponding to a flow rate of the first fluid.

In any of the embodiments described herein, the microfluidic device can include a second inlet in fluid communication with the second flow chamber and disposed proximate the first outlet, the second inlet configured to receive a second fluid.

In any of the embodiments described herein, at least one of the first magnet or the second magnet can be an electromagnet. The microfluidic device can include a controller configured to adjust a magnetic flux of the electromagnet to alter an amount of attraction of the magnetically-labeled cells by the electromagnet.

According to another embodiment of the present invention, a method for antigen expression analysis in whole blood is provided. The method can include combining functionalized magnetic particles with blood. The functionalized magnetic particles can create a plurality of targeted cells and non-targeted cells within the blood, the targeted cells being magnetically-labeled. The method can include providing a microfluidic device. The microfluidic device can include a first inlet to receive the blood with targeted and non-targeted cells. The microfluidic device can include a first flow chamber having a first fluid outlet and a second fluid outlet, the first fluid outlet exiting to a second flow chamber, and the second fluid outlet exiting to a removal channel. The microfluidic device can include a first magnet disposed adjacent to the first flow chamber, the first magnet configured to separate the targeted and non-targeted cells by (i) diverting the targeted cells to the first fluid outlet and (ii) allowing the non-targeted cells to flow to the second fluid outlet and to the removal channel. The microfluidic device can include a plurality of bins, each bin having a first end and a second end, the first end of each bin in fluid communication with the second flow chamber and disposed distal to the first fluid inlet. The microfluidic device can include a second magnet disposed adjacent to the second flow chamber, the second magnet configured to attract the targeted cells towards a bin of the plurality of bins. The microfluidic device can include a plurality of sensors, each sensor disposed at the second end of a corresponding bin of the plurality of bins, each sensor configured to produce a unique signal in response to detecting a targeted cell. The method may further include delivering the blood and cells into the first inlet. The method may include flowing the blood from the first inlet and through the first flow chamber to separate the targeted cells from the non-targeted cells. The method may include flowing the blood from the first fluid outlet, through the second flow chamber, and through the plurality of bins. The method may include receiving the unique signal from a sensor of the plurality of sensors.

In any of the embodiments described herein, the method may include receiving a plurality of unique signals from the plurality of sensors. The method may further include calculating cellular data for the plurality of targeted cells from the plurality of unique signals.

In any of the embodiments described herein, the unique signal of each sensor can include an amplitude corresponding to a size of a targeted cell.

In any of the embodiments described herein, the unique signal of each sensor can include a signal duration corresponding to a flow rate of the blood.

In any of the embodiments described herein, each sensor can be configured to detect a magnetism of a targeted cell.

In any of the embodiments described herein, each sensor can be coded with a multi-bit Gold sequence to produce the unique signal.

In any of the embodiments described herein, each sensor in the plurality of sensors can comprise at least one positive electrode finger and at least one negative electrode finger. The microfluidic device can further include a positive electrode in electrical communication with the positive electrode fingers and a negative electrode in electrical communication with the negative electrode fingers. The bits of the multi-bit Gold sequence of each sensor can be defined by alternating the at least one positive electrode finger and the at least one negative electrode finger.

In any of the embodiments described herein, the method can include adjusting a flow rate of the first fluid to change an amount of attraction of the targeted cells by the second magnet.

In any of the embodiments described herein, at least one of the first magnet or the second magnet can be an electromagnet. The microfluidic device can include a controller configured to adjust a magnetic flux of the electromagnet to alter an amount of attraction of the magnetically-labeled cells by the electromagnet. The method may further include adjusting, via the controller, the magnetic flux of the electromagnet.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE FIGURES

Reference will now be made to the accompanying figures and diagrams, which are not necessarily drawn to scale, and wherein:

FIG. 5 is an exemplary list of digital codes that can be used to create the unique signals for a sensor, according to some embodiments of the present disclosure.

DETAILED DESCRIPTION

Figure 1:
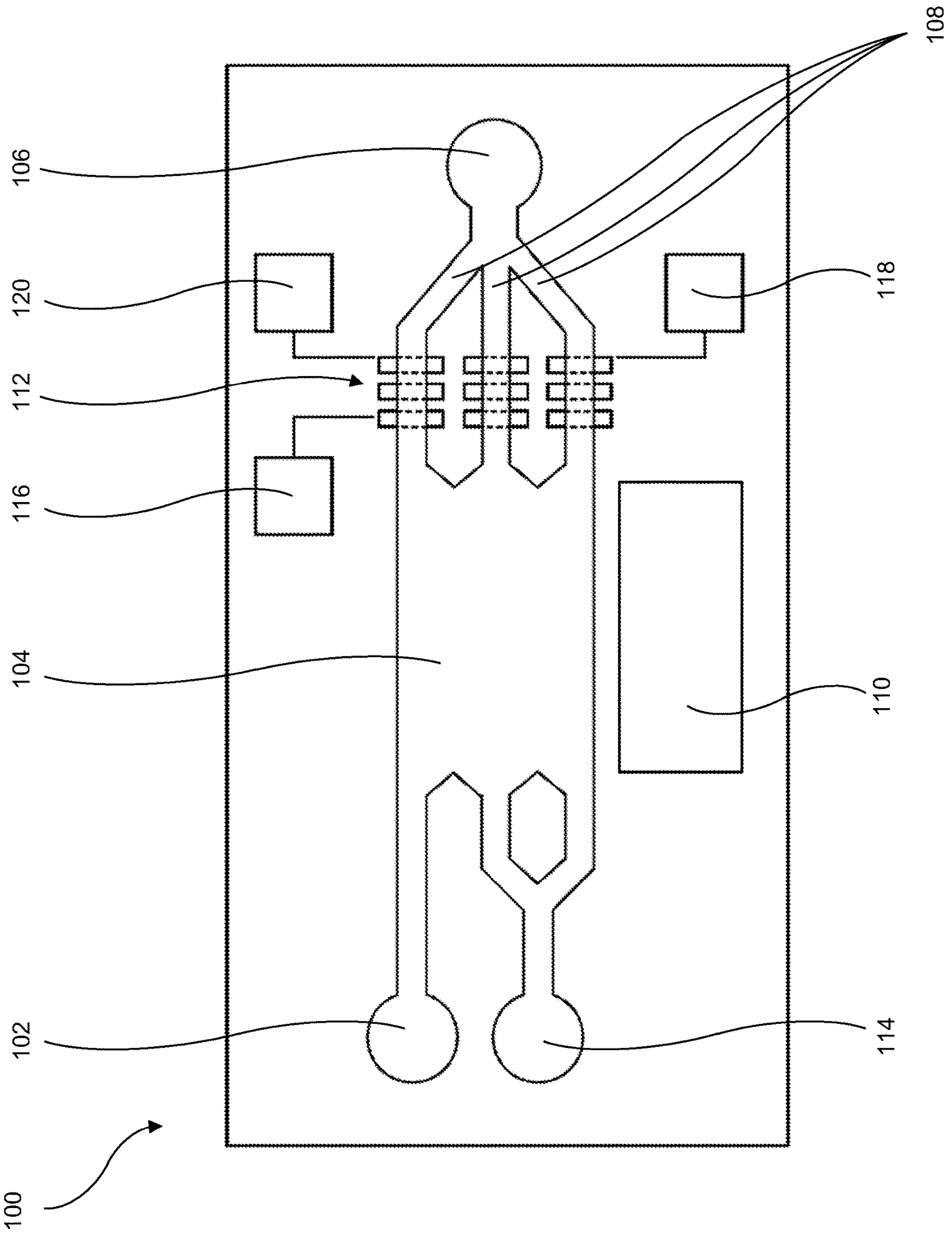
FIG. 1 depicts an exemplary microfluidic device for sorting and analyzing cells, according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms “a,” “an” and “the” include plural references unless the context clearly dictates otherwise. References to a composition containing “a” constituent is intended to include other constituents in addition to the one named.

Ranges may be expressed herein as from “about” or “approximately” or “substantially” one particular value and/or to “about” or “approximately” or “substantially” another particular value. When such a range is expressed, other exemplary embodiments include from the one particular value and/or to the other particular value.

Herein, the use of terms such as “having,” “has,” “including,” or “includes” are open-ended and are intended to have the same meaning as terms such as “comprising” or “comprises” and not preclude the presence of other structure, material, or acts. Similarly, though the use of terms such as “can” or “may” are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of microfluidic platforms using magnetophoresis and Coulter detection to sort and analyze cells. The present disclosure, however, is not so limited and can be applicable in other contexts. For example, some embodiments of the present disclosure may improve the functionality of fluidic systems other than microfluidic devices. Also, although some embodiments of the present disclosure describe using Coulter detection, it will be understood other methods of cellular detection may be used in a device, including but not limited to magnetic sensors, cameras, and the like. These embodiments are contemplated within the scope of the present disclosure. Accordingly, when the present disclosure is described in the context of microfluidic platforms using magnetophoresis and Coulter detection to sort and analyze cells, it will be understood that other embodiments can take the place of those referred to.

Embodiments of the present disclosure relate generally to systems and methods for sorting and analyzing cells and, more particularly, to systems and methods for sorting and analyzing cells using magnetophoresis in a microfluidic platform. Embodiments of the present disclosure provide novel solutions to the limitations of current expression-analyzing and sorting devices. As will be described herein, these novel solutions may include, but are not limited to, using magnetophoresis to sort cells by both surface antigen expression and size, using an electrical sensor network to analyze the sorting of the cells, and providing data on the entire sample of the cells analyzed.

In some embodiments, the presently described systems and methods proceed in three stages. First, sample cells may be immunomagnetically labeled for an antigen of interest and driven into a microfluidic device in a single flow stream. In a second stage, the immunomagnetically labeled cells can deflect from their original trajectory according to their magnetic loads under a transverse magnetic field generated by a magnet. In a third stage, an electrical signal generated by a sensor network can be recorded and processed to acquire the number of cells at each bin and consequently the surface antigen profile within the sample. Throughout this disclosure, when reference is made to a magnetically-labeled cell or cells, it will be understood that this may refer to cells immunomagnetically labeled for an antigen of interest.

Various devices and methods are disclosed for providing systems and methods for sorting and analyzing cells, and exemplary embodiments of the devices and methods will now be described with reference to the accompanying figures.

FIG. 1 depicts an exemplary microfluidic device 100 for sorting and analyzing cells, according to some embodiments of the present disclosure. In some embodiments, a microfluidic device may have an inlet 102. The inlet 102 may be an orifice, channel, aperture, or the like that accepts a sample to be analyzed. As described herein, the sample may include magnetically-labeled cells. In some embodiments, an inlet 102 may be in fluid communication with one end of a flow chamber 104. As the cells enter the flow chamber 104, the cells will begin a flow trajectory from the inlet 102 towards a fluid outlet 106. The figure shows an embodiment having one fluid outlet 106; however, more than one fluid outlet 106 may be provided in a microfluidic device 100.

In some embodiments, the cells in the flow chamber 104 may flow in a set trajectory towards one or more bins 108. As can be seen in the figure, in some embodiments an uninterrupted flow may cause the cells to flow directly from the inlet 102 to the upper bin 108 in the figure. In some embodiments, a magnet 110 may be disposed adjacent to one side of the flow chamber 104, as shown in the figure. When the magnetically-labeled cells enter the flow chamber 104, the magnet 110 can attract the cells. As will be appreciated, labeled cells can then be deflected to different bins 108, depending on the size and amount of surface antigen expression of the cell. When reference is made to the magnet 110 being adjacent to the flow chamber 104, this will be understood to mean that the magnet 110 is positioned alongside at least a portion of a flow chamber 104, as shown in the figure. The term adjacent does not necessarily mean that the magnet 110 is coplanar with the flow chamber 104, though it could be. For example, in some embodiments, the magnet 104 may be placed in a layer above or below the flow chamber 104 (as described in the discussion for FIGS. 14A-G). In some embodiments, a device may have more than one magnet 110 disposed adjacent to the flow chamber 104.

In some embodiments, each bin 108 may comprise sensors 112 that sense a magnetically-labeled cell passing through the respective bin 108. The sensors may be used to record and process the number of cells in the sample that pass through each bin 108. By recording and processing this data, a user of the microfluidic device 100 can ascertain the surface antigen profile within the sample. Information regarding the size of the magnetically-labeled cells may also be provided by an exemplary microfluidic device 100. It is contemplated that the sensors 112 may be one of electrodes, cameras, magnetic sensors, and the like. In some embodiments the sensors 112 may comprise an array of code-multiplexed resistive pulse sensors to electrically quantify and spatially track the deflected cells. To achieve the sensor array, some embodiments of a microfluidic device 100 may comprise a positive electrode 116, a negative electrode 118, and a reference electrode 120.

In some embodiments, a microfluidic device 100 may comprise a second inlet 114 to provide a fluid to the flow chamber 104. As will be appreciated, the second inlet 114 may be provided to create a sheath flow through the flow chamber 104. It is contemplated that the second inlet 114 may receive cell buffers.

Figure 2:
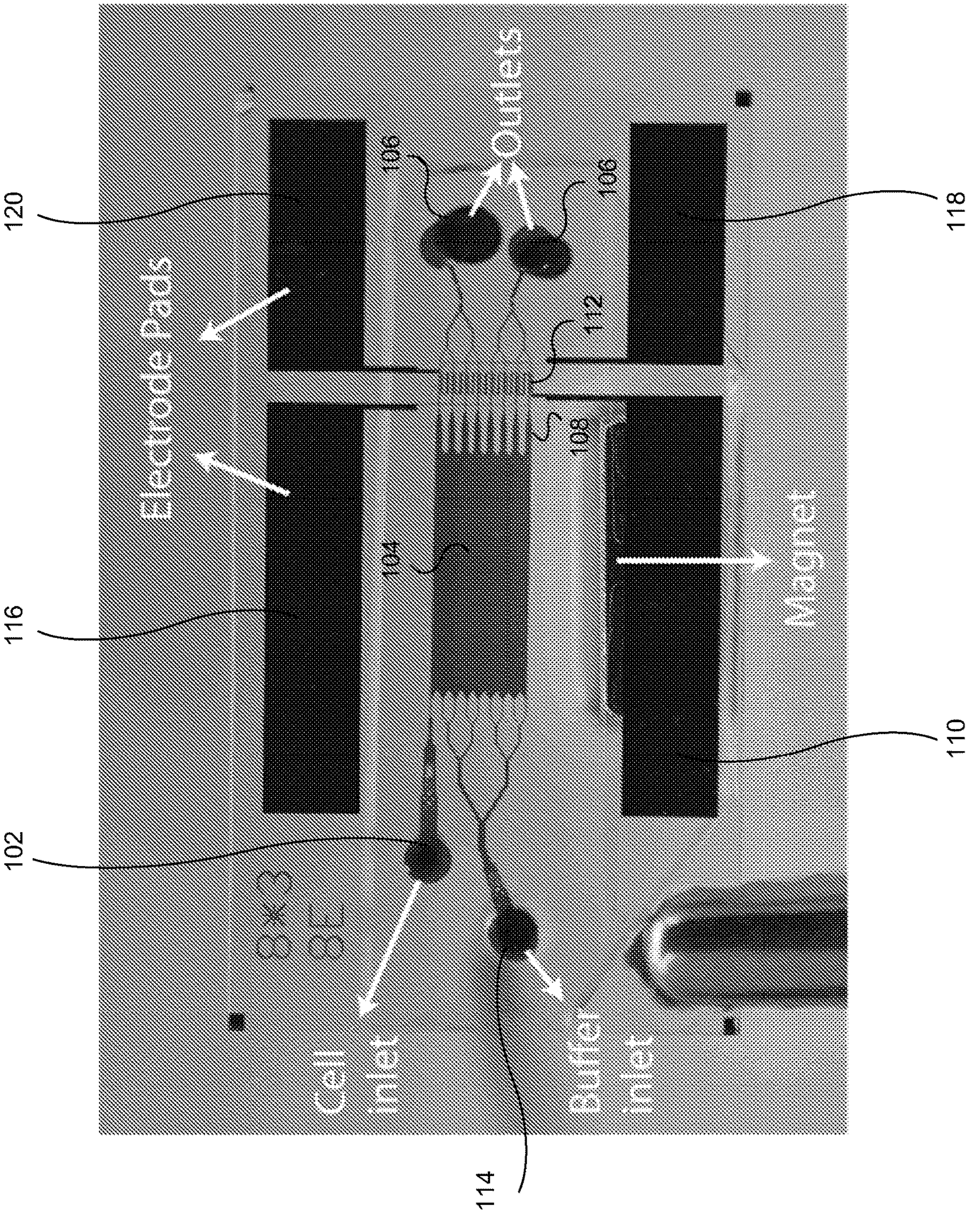
FIG. 2 is a photograph of an exemplary microfluidic device, according to some embodiments of the present disclosure.

FIG. 2 is a photograph of an exemplary microfluidic device 100, according to some embodiments of the present disclosure. The exemplary device shows an embodiment having a cell inlet 102, a second (buffer) inlet 114, and two outlets 106, which is in accordance with the present disclosure. The magnet 110 is positioned adjacent to one side of the flow chamber 104 and, in this embodiment, in a layer (or plane) below the flow chamber 104. The device comprises eight bins 108, each bin having a sensor 112 for detecting magnetically-labeled cells entering the respective bin 108. The sensors in the exemplary microfluidic device 100 shown are each electrically connected to a positive electrode 116, a negative electrode 118, and a reference electrode 120.

Figure 3A:
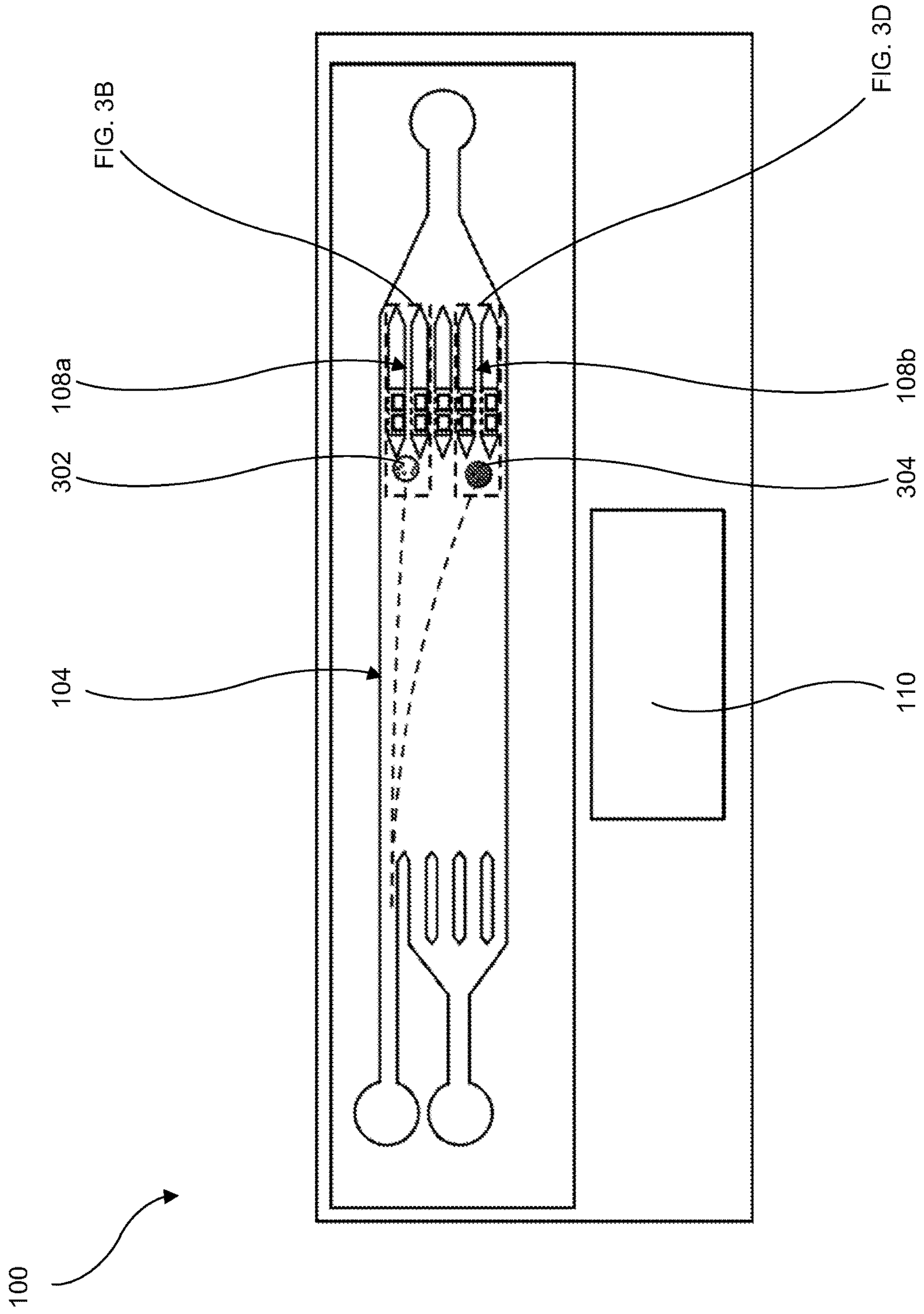
FIG. 3A depicts an exemplary microfluidic device where two magnetically-labeled cells have passed through a flow chamber and have been deflected by a magnet, according to some embodiments of the present disclosure.

FIG. 3A depicts two magnetically-labeled cells that have passed through a flow chamber 104 and have been deflected by a magnet 110, in accordance with some embodiments of the present disclosure. The figure illustrates the effect of the magnetic field of the magnet 110 on the cells 302,304. A first cell 302 comprises less magnetic beads, corresponding to less surface antigen expression. The second cell 304 comprises more magnetic beads, corresponding to a higher degree of surface antigen expression. Accordingly, the diversion of the first cell 302 from its trajectory was less than the diversion of the second cell 304 from its trajectory. Therefore, the second cell 304 has been diverted to a bin 108*b* closer to the magnet 110 and the first cell 302 to a bin 108*a* more distal from the magnet 110. This relationship allows a sensor disposed in each of the bins 108*a,b* to identify the location of the cells 302,304. This data can then be used to calculate the surface expression of the two cells 302,304.

Figure 3B:
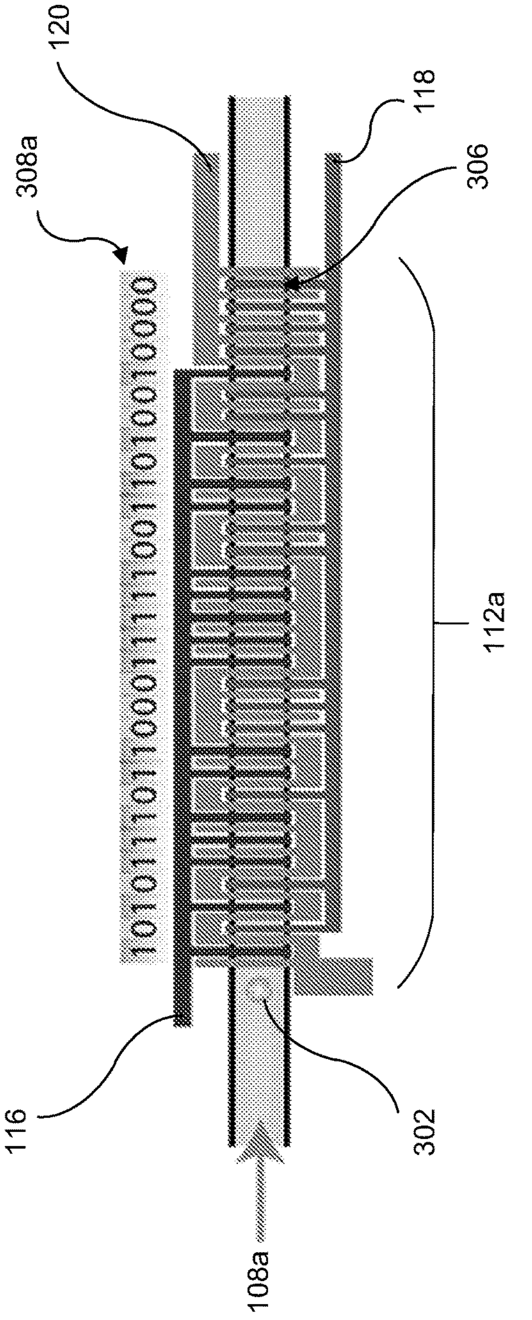
FIG. 3B depicts an exemplary sensor for a bin, according to some embodiments of the present disclosure.

FIG. 3B depicts an exemplary sensor 112*a* for a bin 108*a*, wherein the sensor 112*a* produces a unique signal in response to detecting a magnetically-labeled cell 302. In some embodiments, a sensor 112*a* may generate a unique code to identify the bin 108*a* in which the magnetically-labeled cell 302 entered. In some embodiments, the sensor 112*a* may comprise sensing electrodes that are code-multiplexed with orthogonal Gold sequences to be read from a single electrical output. For example, in FIGS. 1-2, the exemplary microfluidic device 100 comprises a positive electrode 116, a negative electrode 118, and a reference electrode 120. These electrodes can be used to create the unique signal used to identify the bin-placement of the cell 302. In some embodiments, a sensor 112*a* may comprise a one or more electrode fingers 306 positioned about the bin 108*a*. These electrode fingers 306 can be connected to either the positive electrode 116 or negative electrode 118. These alternating positive and negative electrode fingers 306 can produce the unique signal 308*a* in response to detecting a labeled-cell 302 at the electrode finger 306. FIG. 3B shows a unique signal, "1010111011000111110011010010000" for the exemplary sensor 112*a*, that can be relayed to an external computing device to determine the bin 108*a* in which the cell 302 entered.

Figure 3C:
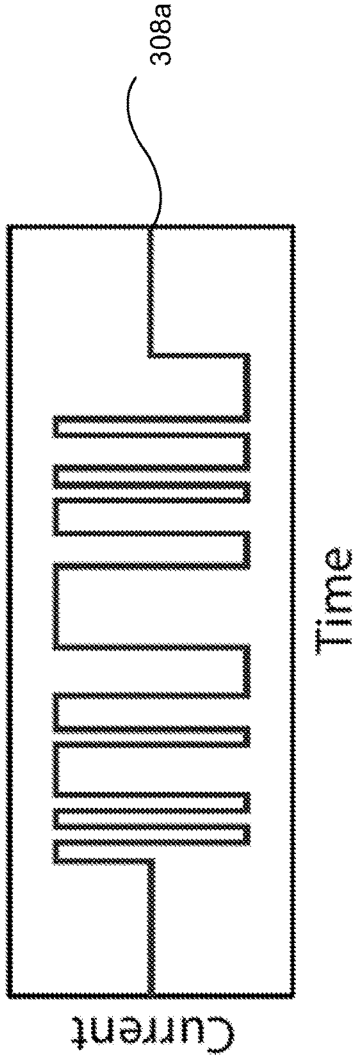
FIG. 3C depicts an exemplary electrical signal produced by a code-multiplexed sensor, according to some embodiments of the present disclosure.

FIG. 3C depicts an exemplary electrical signal produced by a code-multiplexed sensor 112*a*. As can be seen, the data from the sensor 112*a* can provide the voltage received from the sensor 112*a* over a period of time. As will be described in greater detail herein, this data may not only help identify the bin 112*a* in which the cell 302 entered, but the data can also provide information on the flow rate of the fluid traveling through the microfluidic device 100. For example, a longer unique signal 308*a* over a period of time can correspond to a slower flow rate of fluid.

Figure 3D:
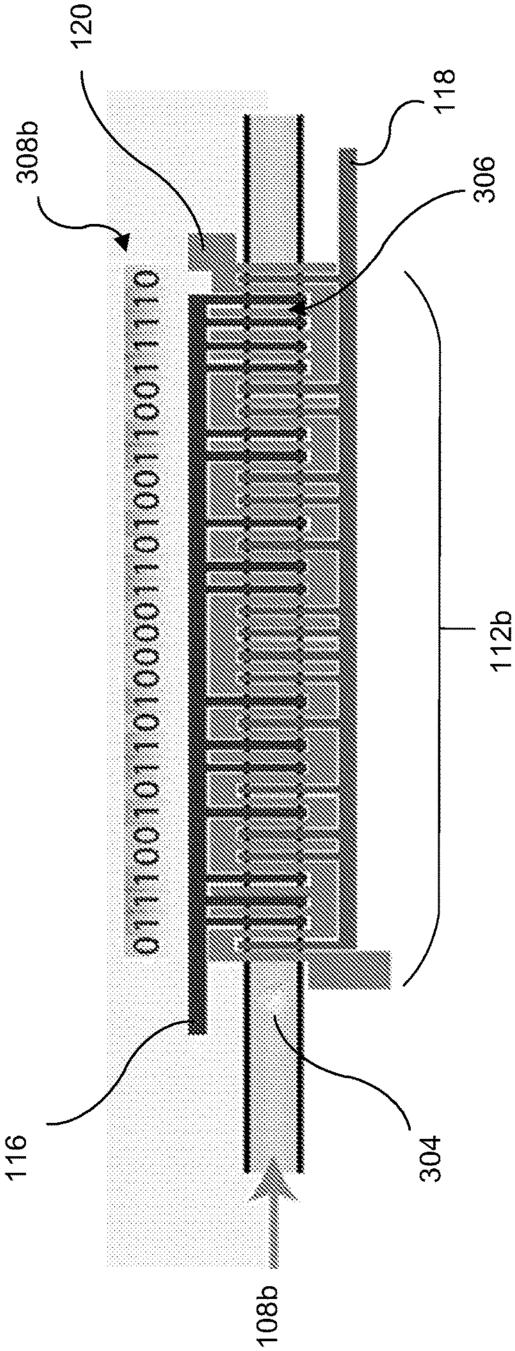
FIG. 3D shows an exemplary sensor for a bin, according to some embodiments of the present disclosure.
Figure 3E:
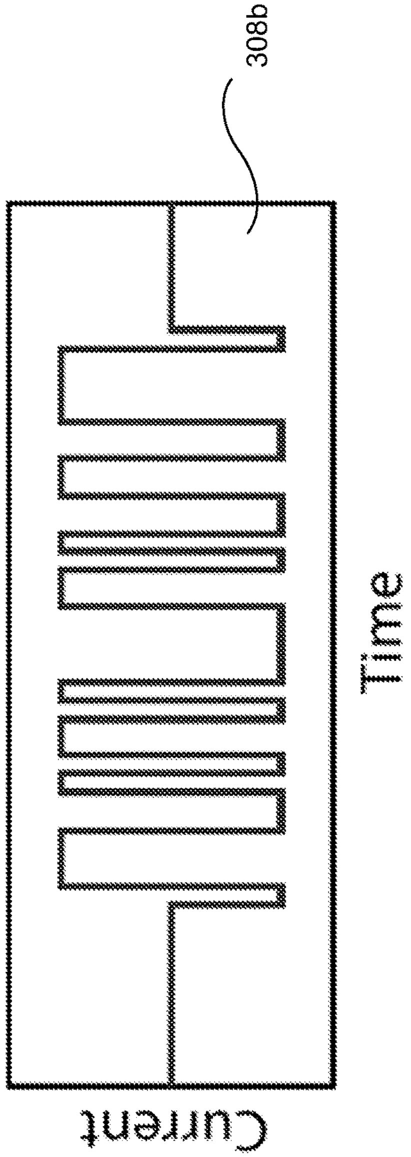
FIG. 3E depicts an exemplary electrical signal produced by a code-multiplexed sensor, according to some embodiments of the present disclosure.

FIG. 3D depicts an exemplary sensor 112*b* for a bin 108*b*, wherein the sensor 112*b* produces a different unique signal in response to detecting a magnetically-labeled cell 304. The figure indicates how a different bin 108*b* may have a different unique signal 308*b* than the first bin 108*a*. This different unique signal 308*b* can be created by alternating the electrode fingers 306 in a different pattern than the first sensor 112*a*. FIG. 3D shows a unique signal, "0111001011010000110100110011110" for the exemplary sensor 112*b*, that can be relayed to an external computing device to determine the bin 108*b* in which the cell 304 entered. FIG. 3E depicts an exemplary electrical signal produced by a code-multiplexed sensor 112*b*. The figure shows how the electrical signal for the second sensor 112*b* is distinct from the first sensor 112*a*.

Figure 4:
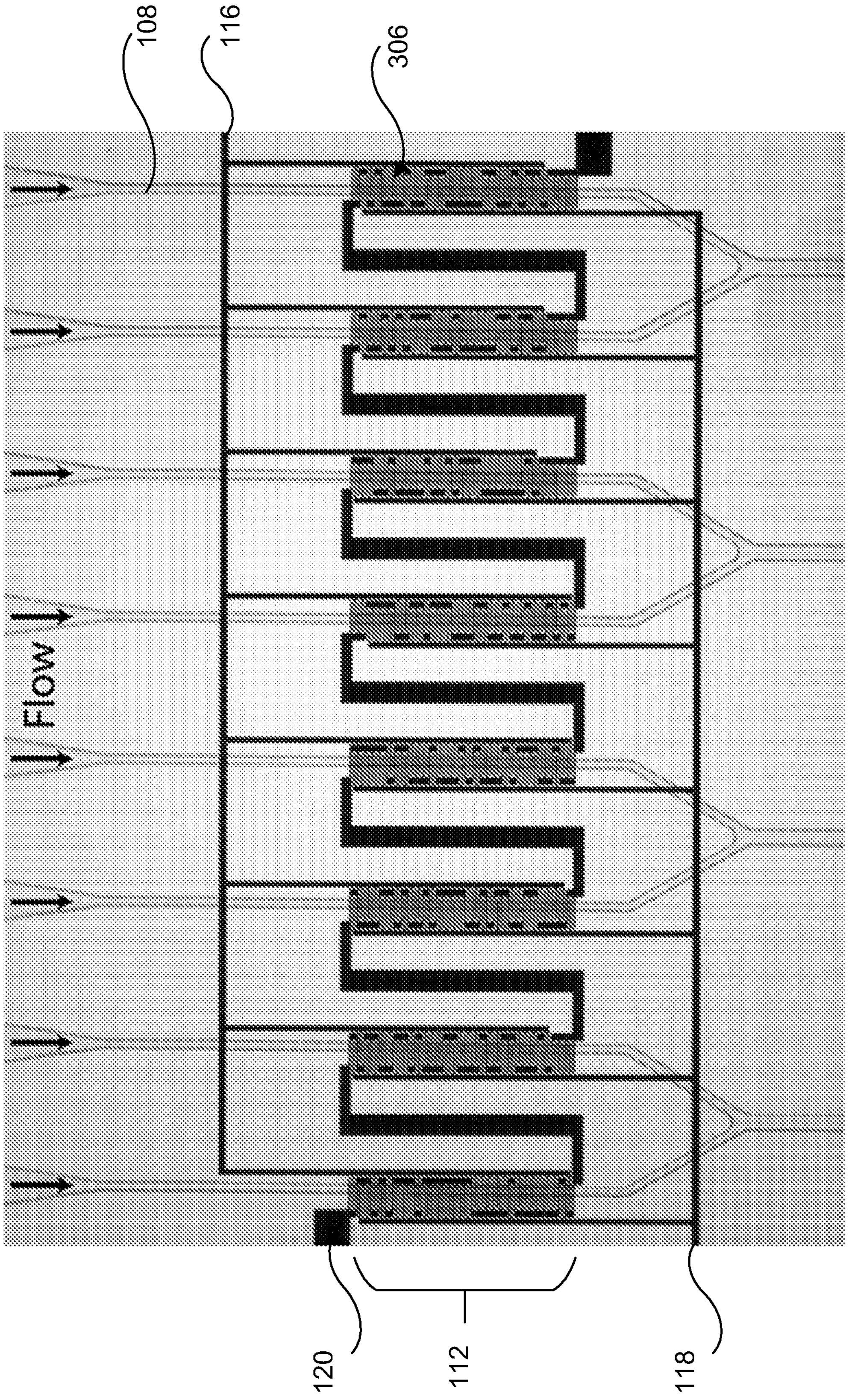
FIG. 4 is a photograph of a series of eight bins and eight corresponding sensors, according to some embodiments of the present disclosure.

FIG. 4 is a photograph of a series of eight bins 108 and eight corresponding sensors 112, in accordance with some embodiments of the present disclosure. As described above, the unique signals 308*a,b* can be implemented by providing one or more electrode fingers 306 in electrical communication with either a positive 116 or negative 118 electrodes. In some embodiments, a sensor 112 may have a reference electrode 120 (shown in FIG. 1). The reference electrode 120 may be provide excitation. For example, electrode fingers 306 of a positive 116 and negative 118 electrode may be distributed around the reference electrode 120 in order to establish the unique signal 308*a,b* sequence. In some embodiments, the reference electrode 120 can be excited to bypass the formation of a double-layer capacitance between the electrode fingers 306. It is contemplated the electrode fingers 306 can range from nanometer scale to micrometer scale in width, length, and in separation gap, depending on the expected size of the particles to be analyzed.

In some embodiments, The unique signals 308*a,b* produced by the sensors 312 can be created by coding the sensor 312 with multi-bit Gold sequences. In some embodiments, the Gold code sequences can be generated by using polynomials to represent linear-feedback shift-registers. FIG. 5 is an exemplary list of digital codes that can be used to create the unique signals 308*a,b* for a sensor 112. In FIG. 5, the 33 Gold sequences can be created by using 5th order polynomials $x^5+x^3+1$ and $x^5+x^3+x^2+x+1$ to represent two linear-feedback shift-registers with the initial states of "10000." The result is a 31-bit Code sequence for use in a sensor 112, which is in accordance with some embodiments. Once a list of code sequences is created, any number of the sequences can be chosen to be used for the unique signal 308*a,b* for the sensors 112. In FIG. 5, eight codes are highlighted to correspond to eight bins 108, which result in an exemplary microfluidic device having 3-bit resolution. In other embodiments, more or less than eight codes can be selected, as a microfluidic device 100 may comprise any number of bins 108. Coulter detection using multi-bit Gold sequences is further described in WIPO Publication Number WO2017/070602 and U.S. application Ser. Nos. 15/770,399, 62/244,918, 62/311,605, and 62/311,605, the entire contents of which are hereby incorporated by reference as if fully set forth below.

Calibrating a Microfluidic Device

Figure 6:
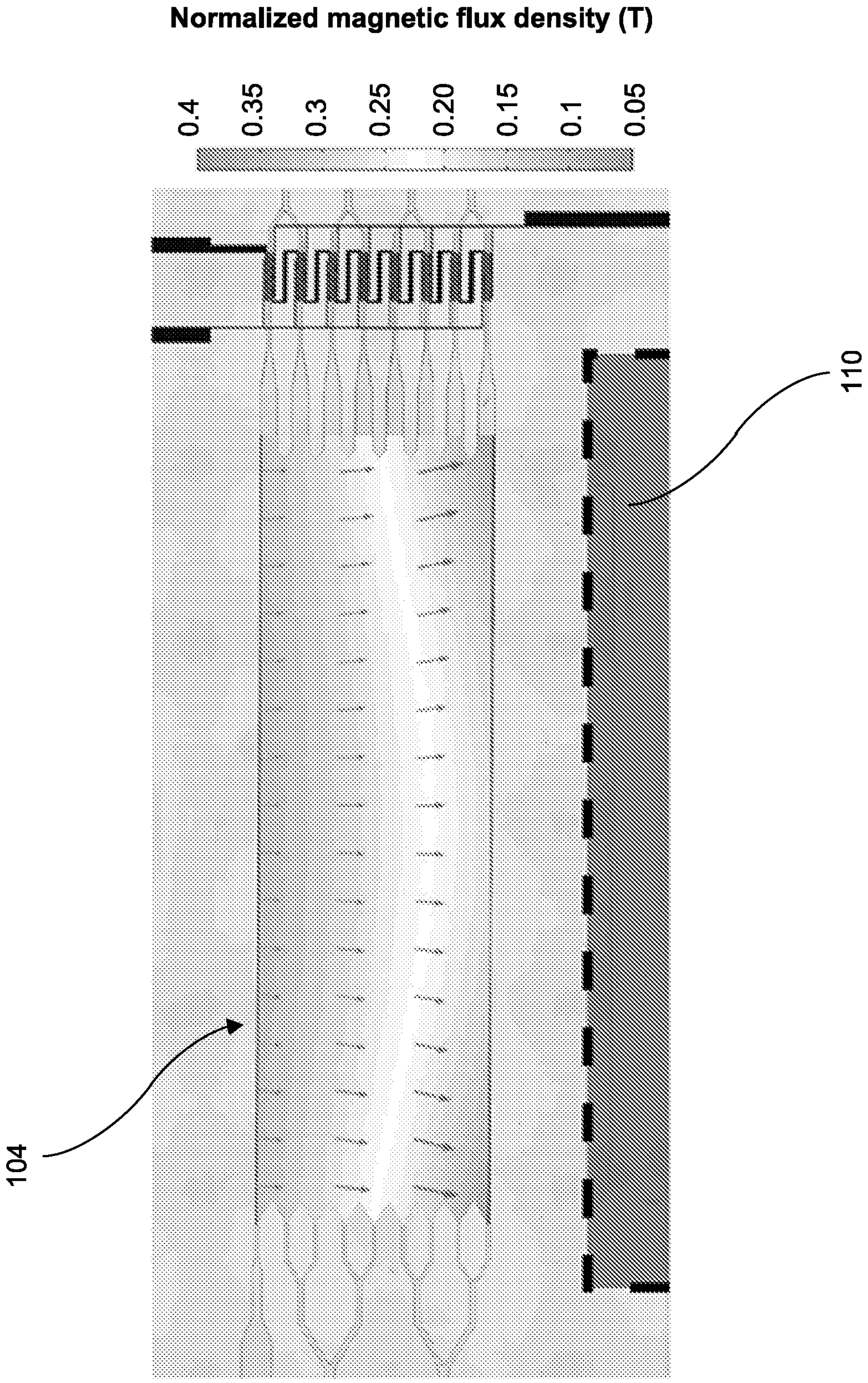
FIG. 6 is an exemplary magnetic field amplitude plot overlaid onto a microfluidic device.

To calibrate a microfluidic device to determine the amount of surface antigen expression or size of the cell, a model of magnetophoretic cell sorting can be created. A model can simulate the magnetic flux density in the flow chamber 104 based on the manufacturer-provided specifications of the magnet and its positioning with respect to the microfluidic chamber. FIG. 6 is an exemplary magnetic field amplitude plot overlaid onto a microfluidic device 100. The resultant magnetic force on a labeled cell can be calculated from the gradient of the dot product of the magnetic flux density and the cell magnetic moment, which can be estimated from the manufacturer-provided size and permeability of the magnetic beads.

Figure 7:
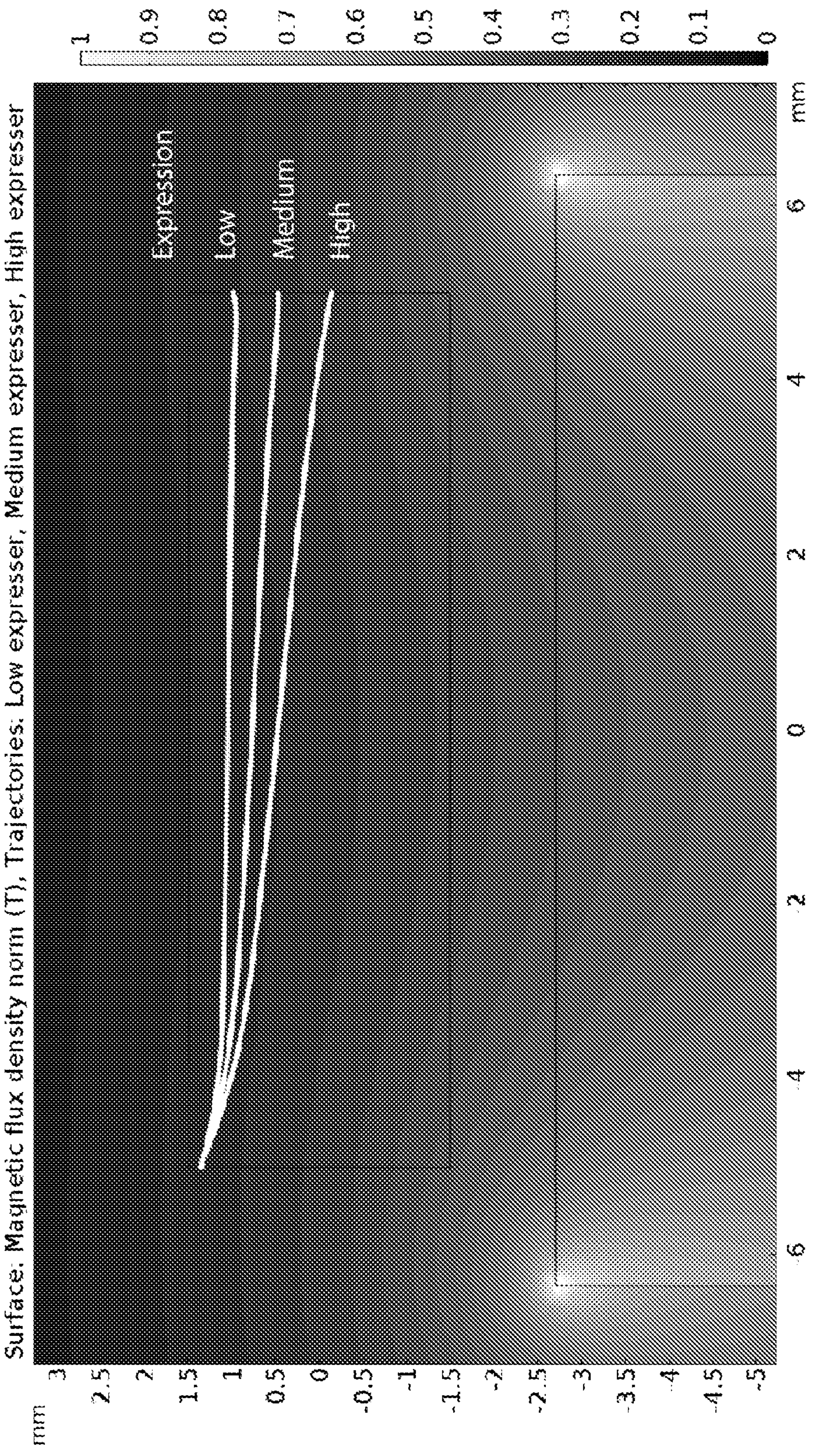
FIG. 7 depicts a simulated flow trajectory of a low, a medium, and a high expresser cell of the same size, in accordance with some embodiments, according to some embodiments of the present disclosure.

Using the calculated magnetic force on a labeled cell, simulated magnetic particle flow trajectories can be modelled for the system. FIG. 7 depicts a simulated flow trajectory of a low (10 beads), a medium (50 beads), and a high (100 beads) expresser cell of the same size (r=8 μm), in accordance with some embodiments. In some embodiments, these simulated trajectories can be used to determine the expression levels at each bin 108.

Figure 8:
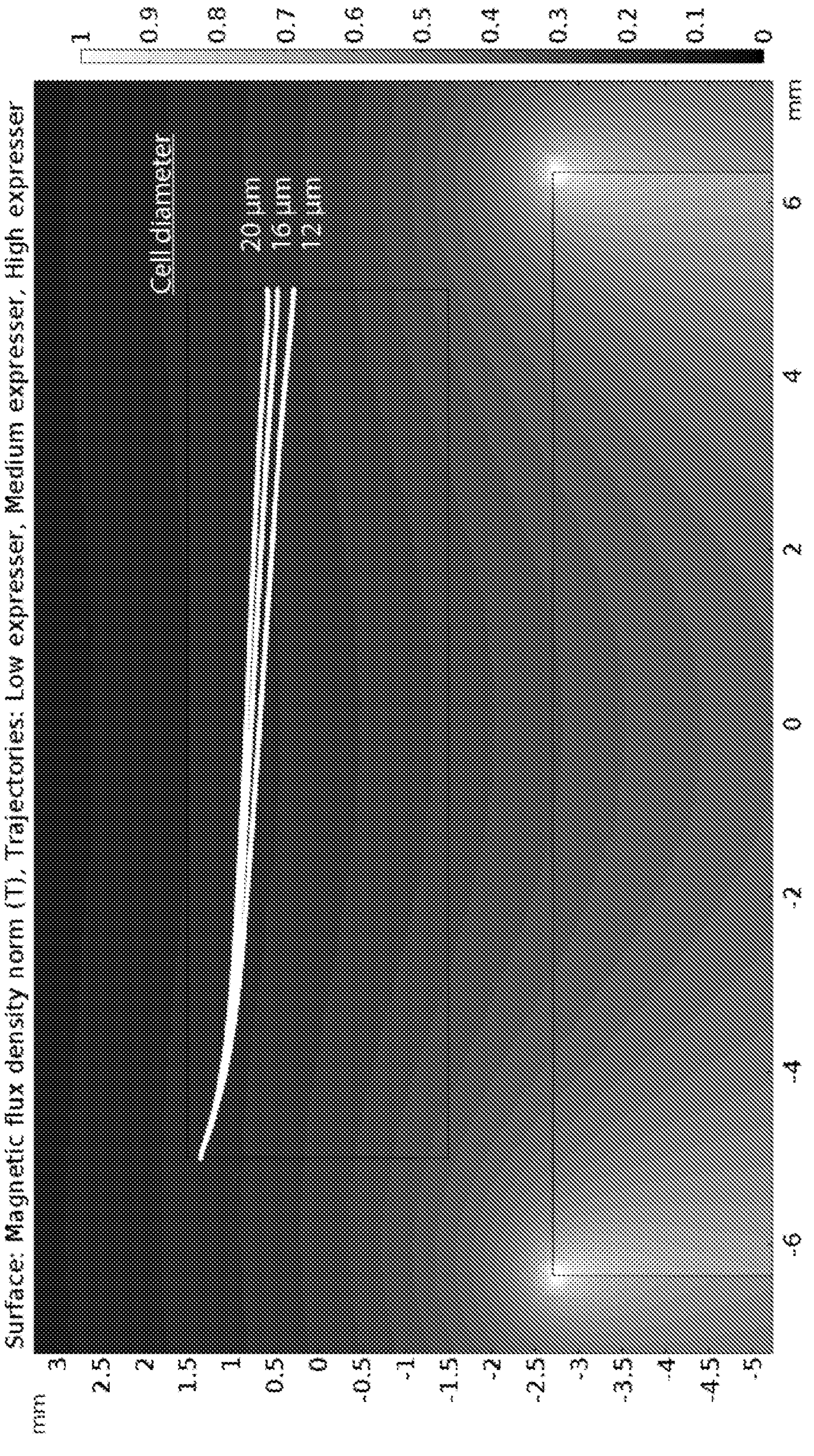
FIG. 8 depicts a model of the deflection of cells having varying radii, according to some embodiments of the present disclosure.
Figure 9:
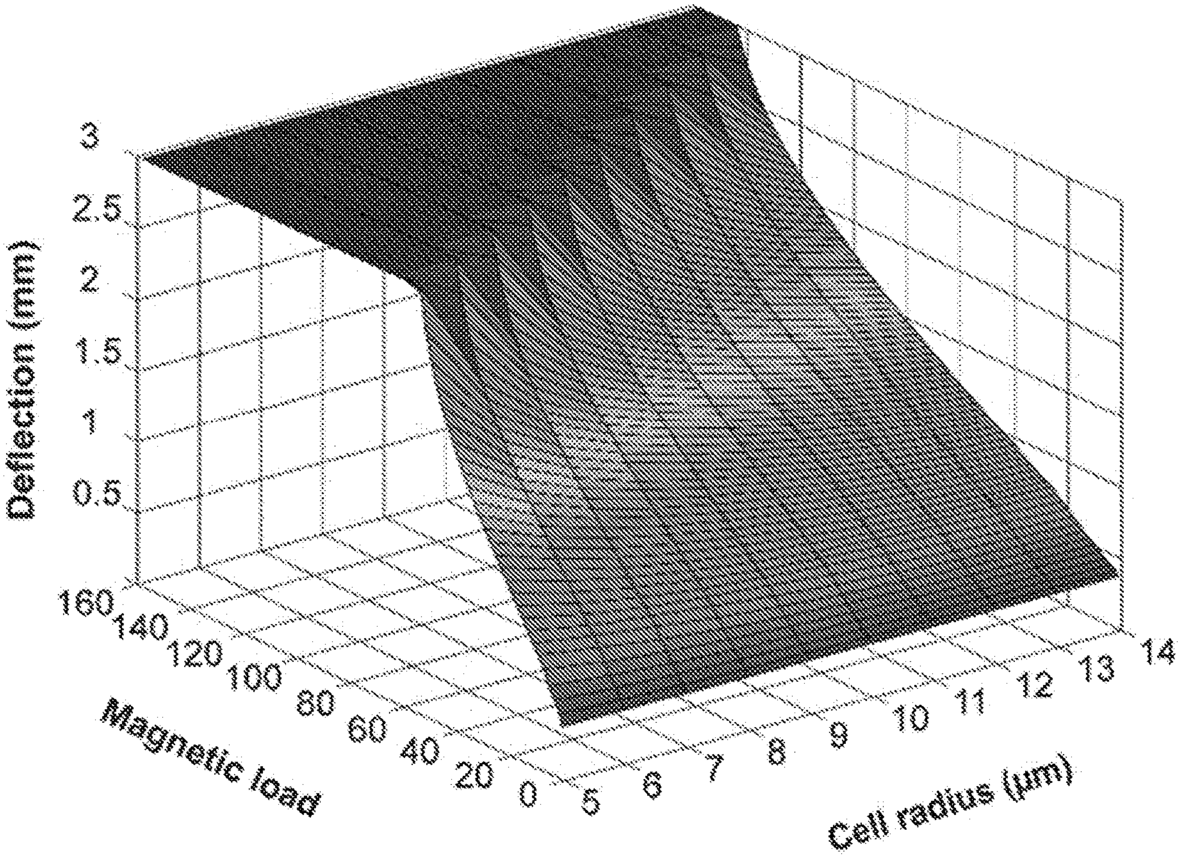
FIG. 9 shows an exemplary calibration curve for a sample drive pressure of 30 mbar in a microfluidic device, according to some embodiments of the present disclosure.

FIG. 8 depicts a model of the deflection of cells having varying radii. In other words, each cell in the model has the same level of surface antigen expression, but the cells have radii of either 20 μm, 16 μm, or 12 μm. Larger cells face a higher frictional force according to the Stokes Law, and, therefore, can travel a shorter distance in the transverse axis than smaller cells under the same magnetic forces. By running a series of finite element analysis, the calibration curves that map cell radius and transverse deflection to magnetic load can be extracted for magnetophoretic sorting systems. FIG. 9 shows an exemplary calibration curve for a sample drive pressure of 30 mbar in a specific magnetophoresis device with 1 cm by 3 mm flow chamber (i.e., flow chamber 104) that is 1.2 mm away from an N42 permanent magnet with dimension of ½ inch (length)×¼ inch (width)×½ inch (thickness). This analysis shows that cell size may also be considered for the acquisition of the actual magnetic load, because same deflection may correspond to different magnetic load for cells with different radii.

Signal Acquisition and Processing

Figure 10:
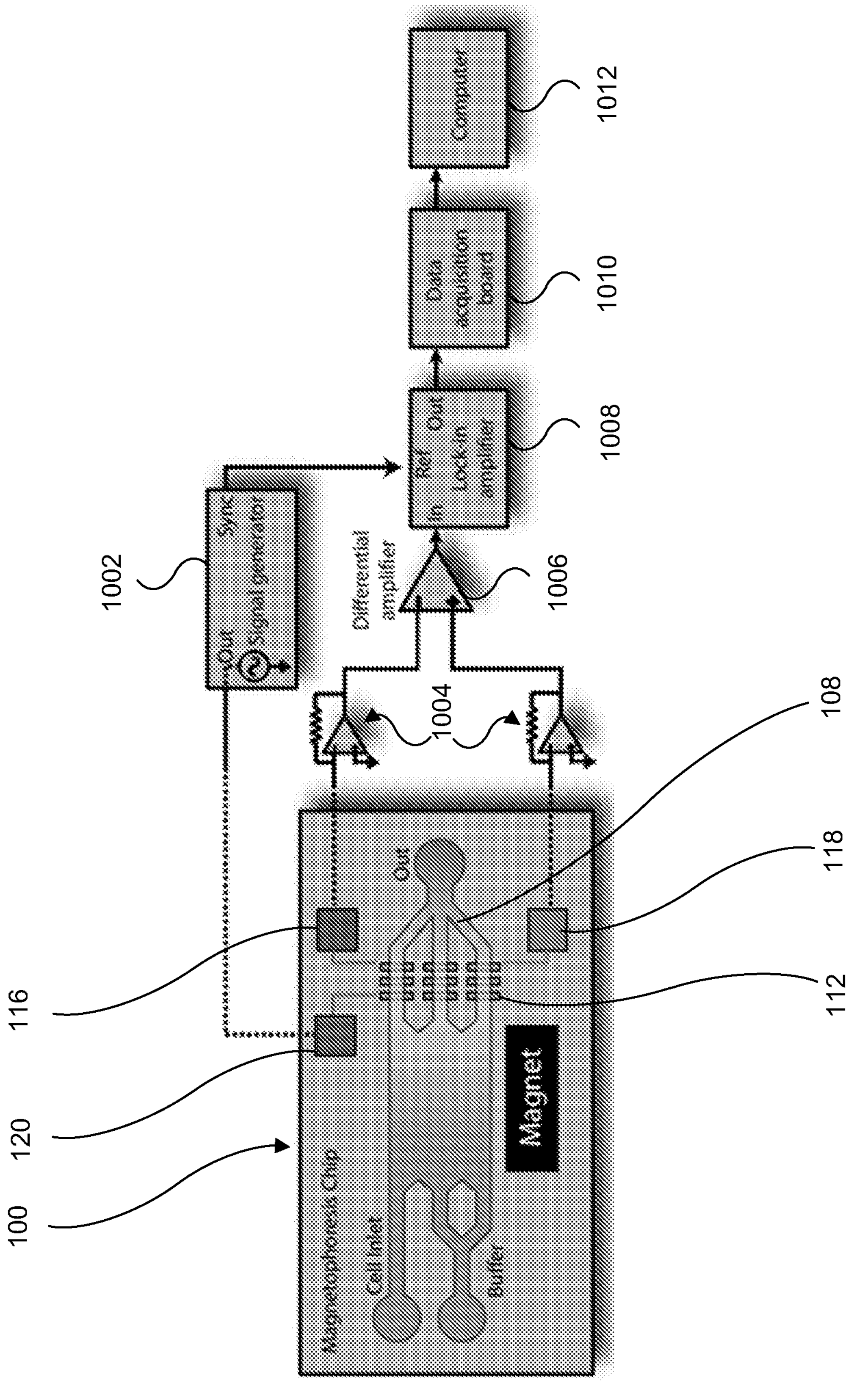
FIG. 10 is an exemplary component diagram showing how signals from labeled cells can be acquired and processed, according to some embodiments of the present disclosure.

FIG. 10 is an exemplary component diagram showing how signals from labeled cells can be acquired and processed, in accordance with some embodiments of the present disclosure. In some embodiments, a reference electrode 120 of a sensor 112 can be excited by a sine wave (e.g., 500 kHz) at a signal generator 1002 to bypass the formation of double-layer capacitance between the electrode fingers 306 (not shown in FIG. 10). The electrical currents from positive 116 and negative 118 electrodes can be acquired and converted into voltage signals using transimpedance amplifiers 1004. The signals can also be subtracted by a differential amplifier 1006 to create a bipolar signal. In some embodiments, the amplitude of the signal can be measured by a lock-in amplifier 1008. The output of the lock-in amplifier 1008 can be sampled with a data acquisition board 1010 into a software to record, generate templates, and decode the signal at a computing device 1012.

Figure 11A:
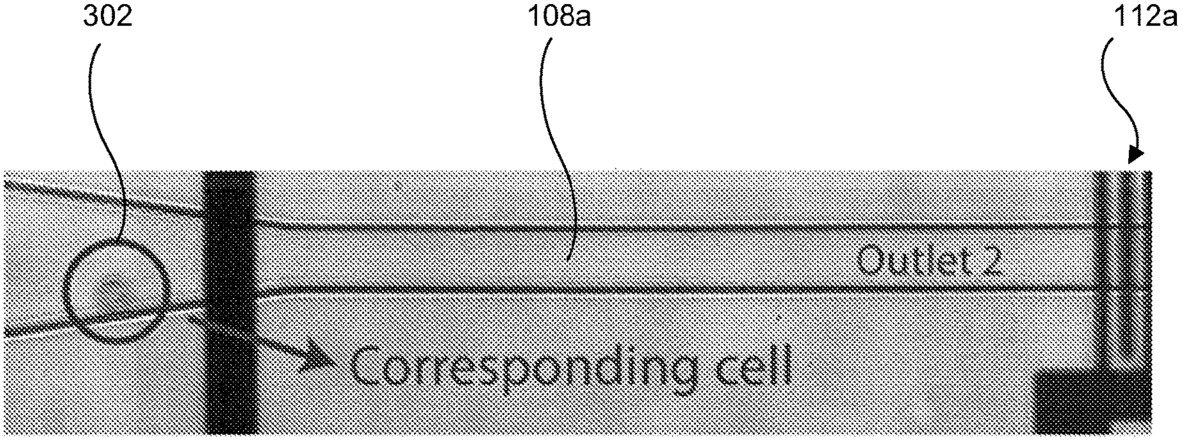
FIG. 11A is a photograph of a magnetically-labeled cell entering a bin, according to some embodiments of the present disclosure.
Figure 11B:
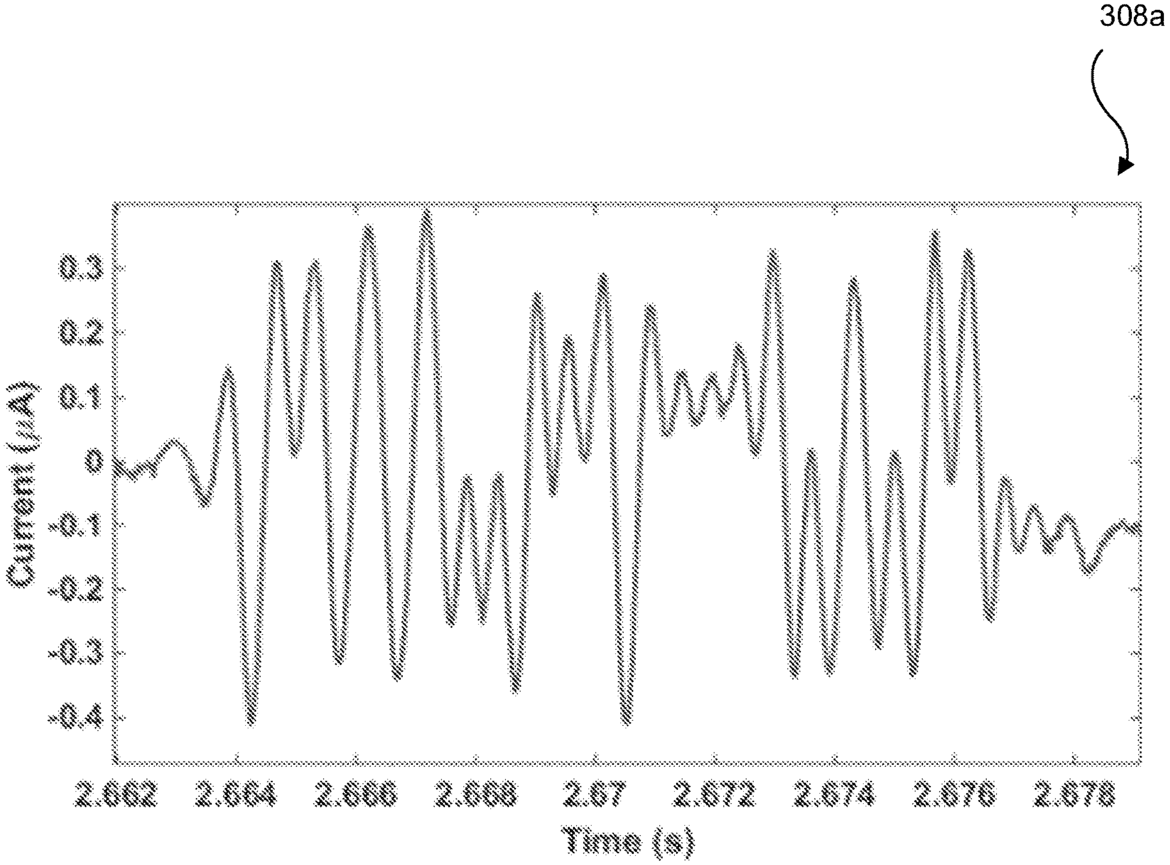
FIG. 11B depicts a unique signal associated with the sensor of FIG. 11A, according to some embodiments of the present disclosure.

FIGS. 11A-F depict exemplary signals processed with multi-bit Gold sequence sensors 112, in accordance with some embodiments of the present disclosure. FIG. 11A is a photograph of a magnetically-labeled cell 302 entering a bin 108*a* (labeled "Outlet 2" in the figure). As the cell 302 passes the sensor 112, the sensor 112*a* may create a unique signal 308*a* identifying the bin 108*a* in which the cell 302 entered. FIG. 11B depicts a unique signal 308*a* associated with the sensor 112*a* of FIG. 11A.

Figure 11C:
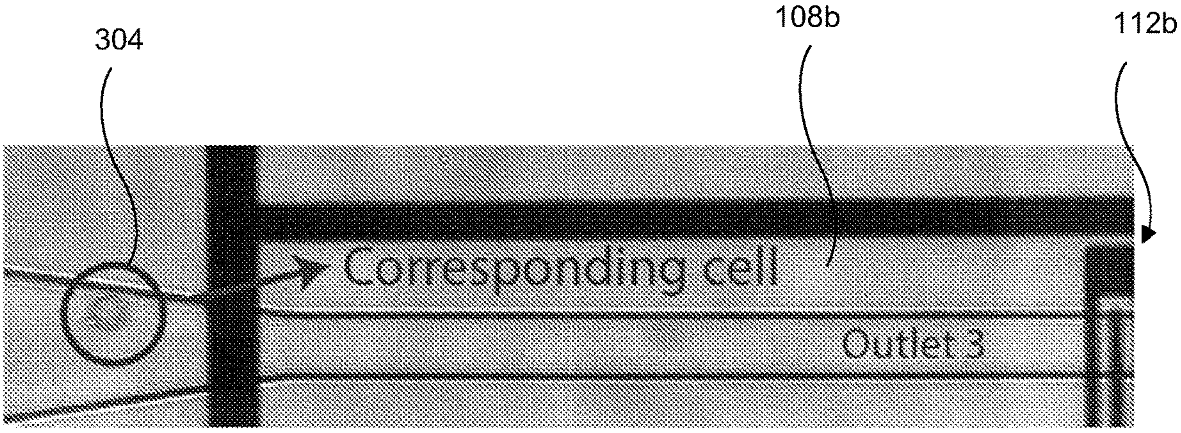
FIG. 11C is a photograph of a magnetically-labeled cell entering a bin, according to some embodiments of the present disclosure.
Figure 11D:
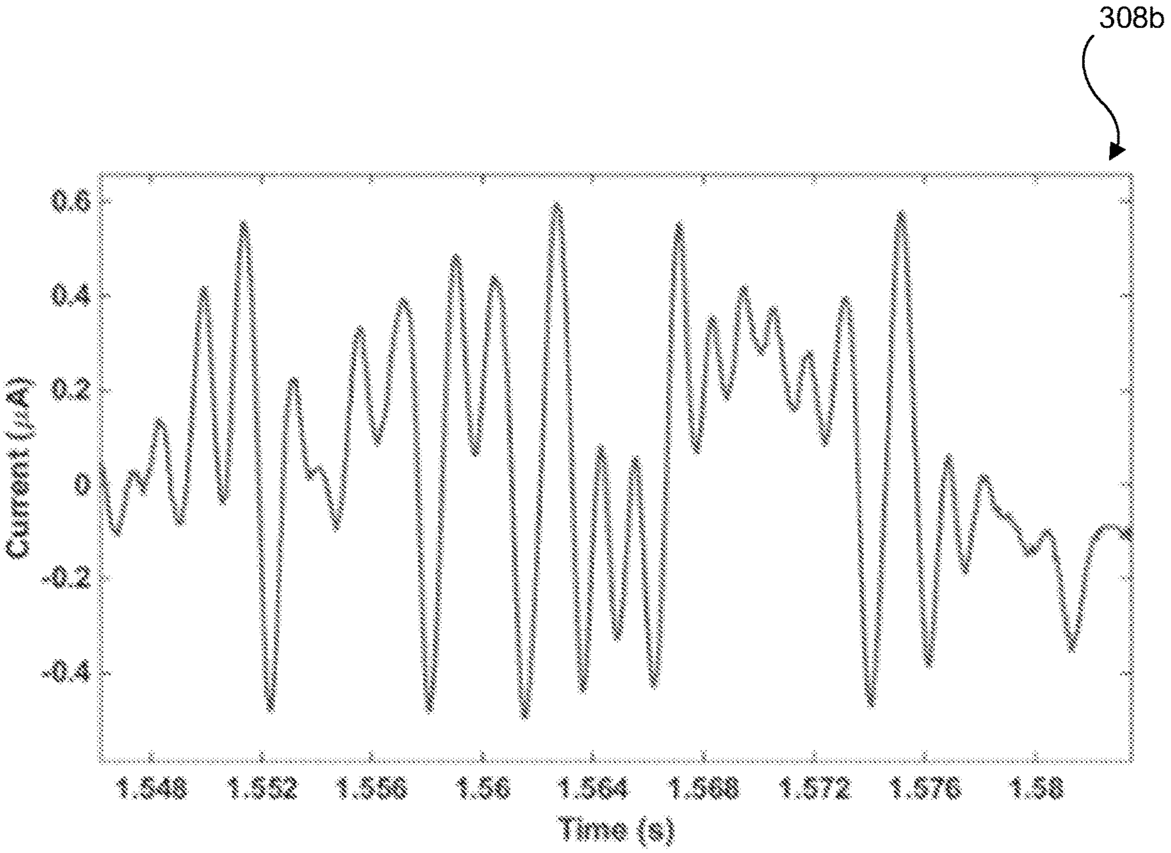
FIG. 11D depicts a unique signal associated with the sensor of FIG. 11C, according to some embodiments of the present disclosure.

FIG. 11C is a photograph of a magnetically-labeled cell 304 entering a different bin 108*b* (labeled "Outlet 3" in the figure) than the bin 108*a* in FIG. 11A. The sensor 112*b* in the figure may comprise a different Gold sequence than the first sensor 112*a* of FIG. 11A, thus creating a separate unique signal 308*b*. FIG. 11D depicts a unique signal 308*b* associated with the sensor 112*b* of FIG. 11C.

Figure 11E:
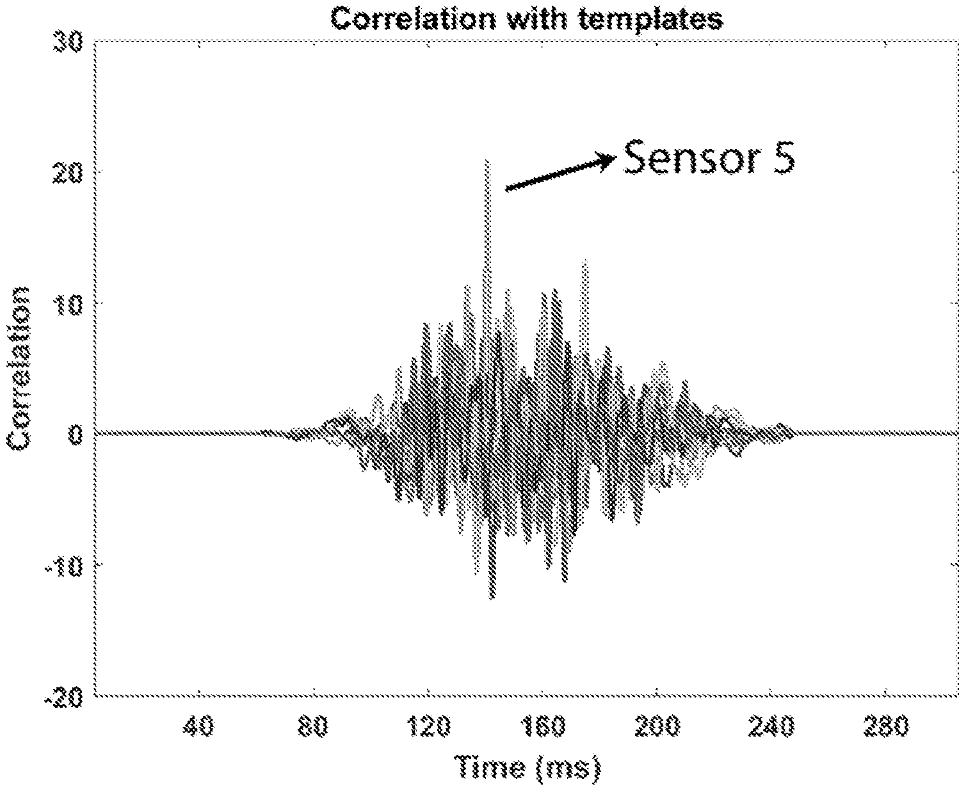
FIG. 11E depicts a plurality of signals, wherein a unique signal for a bin can be processed from the plurality of signals, according to some embodiments of the present disclosure.
Figure 11F:
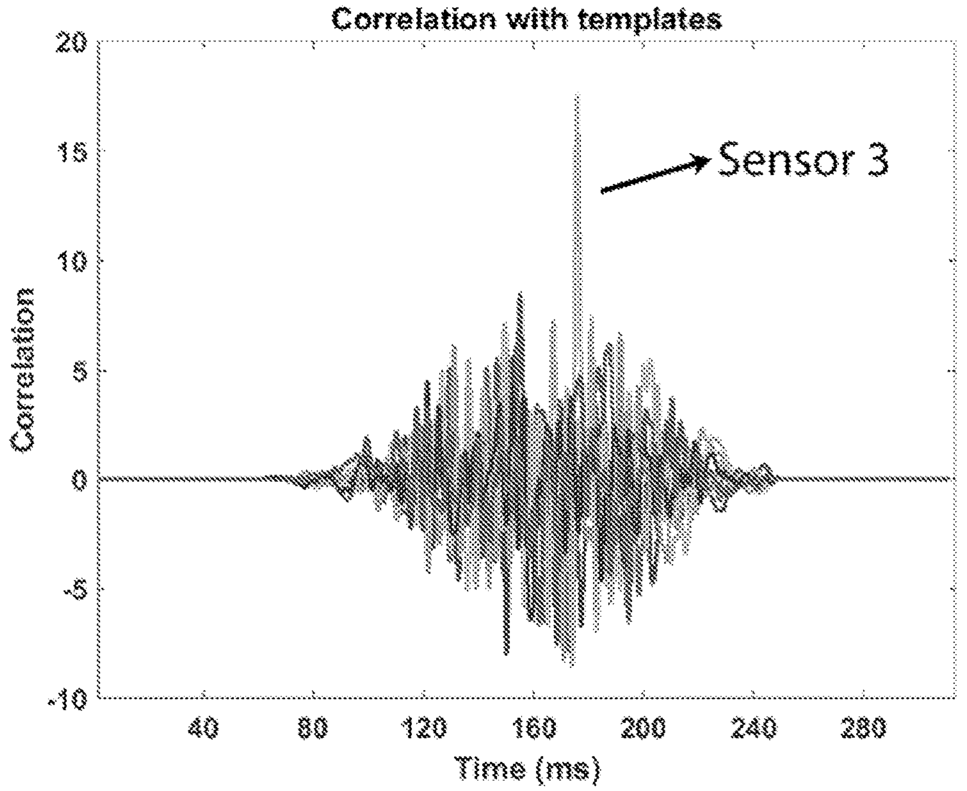
FIG. 11F depicts a plurality of signals, wherein a unique signal for a bin can be processed from the plurality of signals, according to some embodiments of the present disclosure.

FIGS. 11E-F show how each signal can be overlaid and processed together by a computing device (e.g., computing device 1012 of FIG. 10). As can be seen from the figures, electrical signals obtained by the sensor 112*a,b* network can correspond to the magnetic load of the cells 302,304. The spike in amplitude can indicate which bin 108*a,b* received the cell 302,304. In some embodiments, the code-multiplexed electrical sensor 112*a,b* network can resolve situations when multiple cells are simultaneously present (i.e., coincident cells) in the sensing area using successive interference cancellation. For example and not limitation, the signal corresponding to a larger cell can be estimated using the highest correlation value and the estimated waveform can be subtracted from the original signal to cancel its interference. The process can be repeated to identify remaining sensor signals until the residual signal does not produce a correlation above a set threshold.

Figure 12:
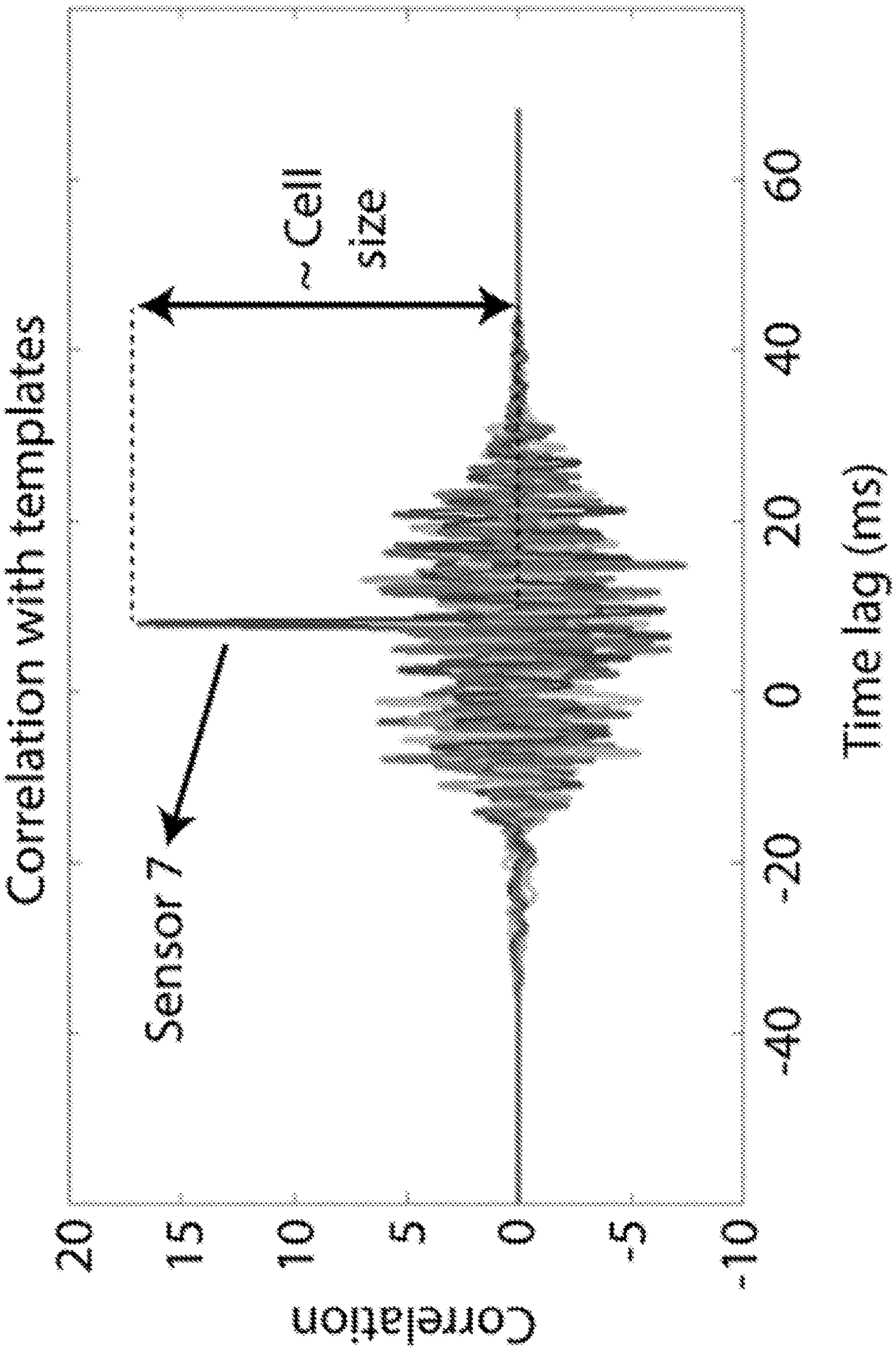
FIG. 12 depicts exemplary signals from a microfluidic device, showing a cell being detected by a sensor, according to some embodiments of the present disclosure.

In some embodiments, the size of a cell can be estimated based on the unique signal 308 from the sensor 112. FIG. 12 depicts exemplary signals 308 from a microfluidic device 100, showing a cell being detected by a sensor 112, in accordance with some embodiments of the present disclosure. The volume of a labeled cell can be proportional to the output signal 308 of the sensor 112. By comparing, for each cell, the peak template cross-correlation value as a measure for the signal amplitude, a cell radius can be calculated by setting the mean signal amplitude from the whole sample to match the average cell size obtained from microscopy analysis of the cells.

High Dynamic Range Expression Profiling

In some embodiments, the dynamic range of surface expression measurement can be enhanced by modulating the flow rate during processing and cumulatively analyzing the sample response. With this approach, the varying flow rates may change the cell residence time in a flow chamber 104 and therefore the bins 108 can be tuned to discriminate cells at different ranges of magnetic field. This varying of flow rate may increase the dynamic range of surface expression that can be analyzed.

This approach may be similar to how a high dynamic range photo is compiled by digital cameras as multiple images shot under different exposures to the "light" field are computationally merged into a single frame. Similarly, with the presently disclosed systems and methods, a user may combine all cell sorting data obtained under different "force" exposures controlled by the flow rate to create an expression histogram and achieve a dynamic range substantially higher than the number of bins 108 in the microfluidic device 100. For example, in the case of an 8-bin device, substantially higher than a 3-bit dynamic range can be offered by altering the flow rate through a flow chamber 104.

In some embodiments, the unique signal 308 produced by a sensor 112 can be used to determine a flow rate through a bin 108. As can be seen in FIG. 12, a unique signal 308 may provide data of output from a sensor over a period of time, or a signal duration. Accordingly, a unique signal 308 with a longer signal duration can correspond to a slower flow rate of fluid, and vice versa. In some embodiments, a user may use this information to modulate the flow rate to adjust the dynamic range of surface expression measurement. In some embodiments, a system may use the signal duration to automatically modulate the flow rate to adjust the dynamic range. For example, a system may include a controller, which may include a data acquisition system and software (such as the data acquisition 1302 and software 1304 in FIG. 13), that monitors the signal duration and provides feedback to a fluid delivery mechanism at the cell inlet 102, a second inlet 114, or both.

Figure 13:
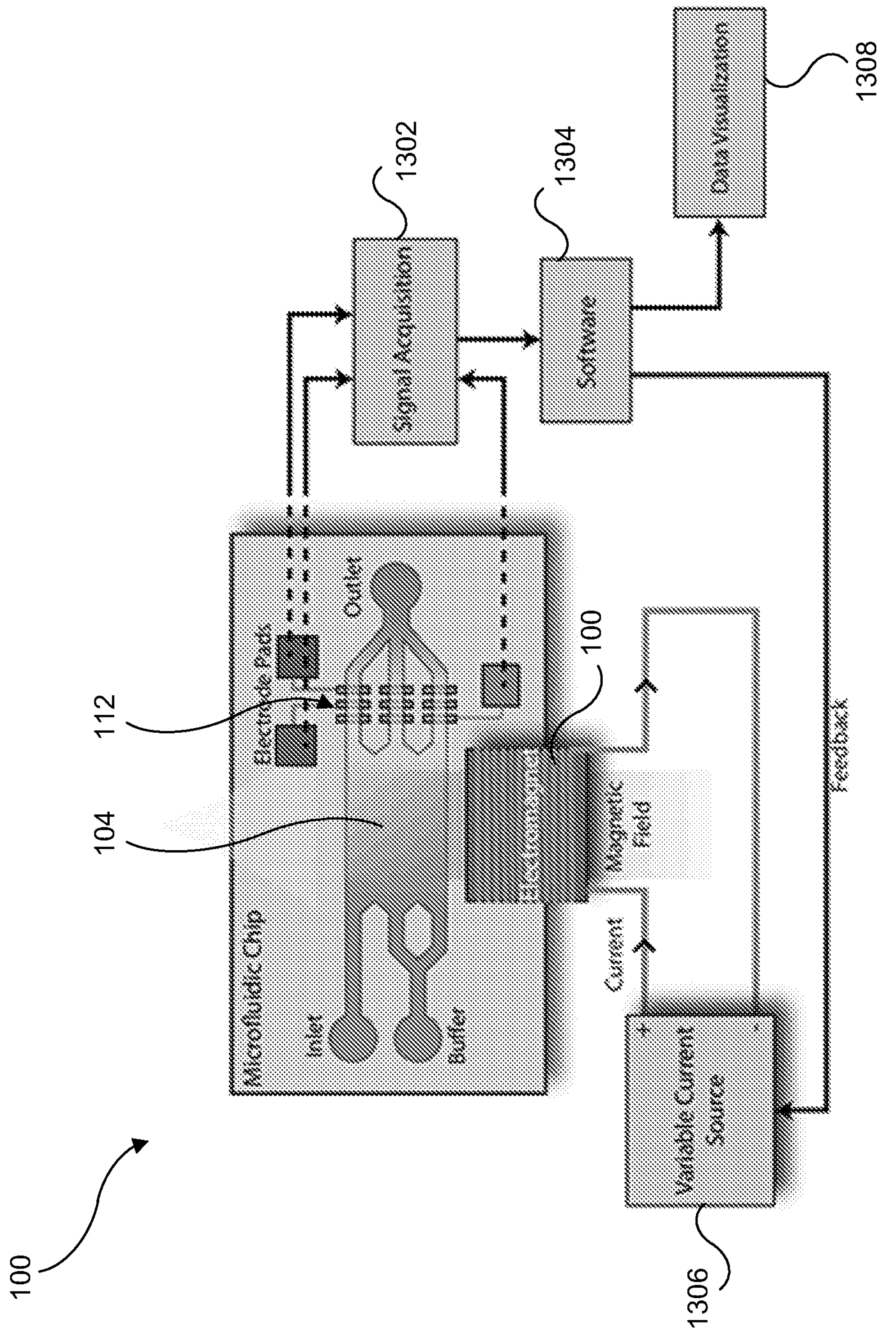
FIG. 13 is a component diagram depicting an exemplary high-dynamic-range setup using magnetic field variation, according to some embodiments of the present disclosure.

In some embodiments, the dynamic range of surface expression measurement can be enhanced by modulating the magnitude of the magnetic field gradient at the flow chamber 104. FIG. 13 depicts an exemplary high-dynamic-range setup using magnetic field variation, in accordance with some embodiments of the present disclosure. In some embodiments, a sample of cells may be flowed into a sheath flow into the flow chamber 104. The labeled cells may be attracted to a magnet 110 that, in this embodiments, is an electromagnet. In these embodiments, a controller may adjust the magnetic flux of the electromagnet 110 to alter an amount of attraction between the magnetically-labeled cells and the electromagnet 110. The controller may include a series of components that read the data from the sensors 112 and manipulate the magnetic flux of the magnet 110. For example, the labeled cells may be quantified by the sensor 112 network for each different magnetic field generated by the electromagnet 110. In some embodiments, the electrical signal from the sensors 112 can be acquired 1302 and processed by software 1304. The results can then be converted into magnetic load distribution. The magnetic field variation can be implemented with DC or AC as a ramp, pulse, or in a continuous feedback loop with the data acquisition 1302 system. The variable magnetic field can be created with a variable current source 1306. In some embodiments, the system may include an interface for data visualization 1308.

Experimental Section

Design Methods

To test the currently-described systems, a microfluidic device similar to the embodiment shown in FIGS. 1-2 was created for validation. The exemplary microfluidic chip was designed with two inlets, one sample (e.g., cell) inlet and one buffer inlet that bifurcates into eight 30 μm-wide channels for creating a sheath flow. The sample inlet and buffer inlet lead to a 1 cm by 3 mm flow chamber supported by 13 uniformly-distributed pillars for magnetophoretic deflection of labeled cells. At the end of the chamber, the outward flow was divided into eight 30 μm-wide and uniformly-spaced discrete bins for spatial mapping of sorted subpopulations. These bins join after the sensing area, and the analyzed sample is discharged off the device from two outlets. In other embodiments, each bin may empty into separate outlets to maintain separation of each bin's output.

The digital codes used for multiplexing the electrical sensors were generated in the form of 31-bit Gold sequences. The 5th order polynomials $x^5+x^3+1$ and $x^5+x^3+x^2+x+1$ were used to represent two linear-feedback shift-registers with the initial states of "10000." A set of 33 Gold sequences was obtained by these polynomials, and 8 of sequences were chosen to be employed in the electrical sensors. These codes were implemented with only 3 electrodes: two (a positive and a negative) sensing electrodes and a reference electrode placed between all sensing electrodes for excitation. Positive and negative electrode fingers were distributed around the reference electrode in order to establish the desired code sequence. Each electrode finger was 5 μm-wide, 90 μm-long and is separated from another by a 5 μm gap.

Figures 14A, 14B, 14C, 14D, 14E, 14F, 14G:
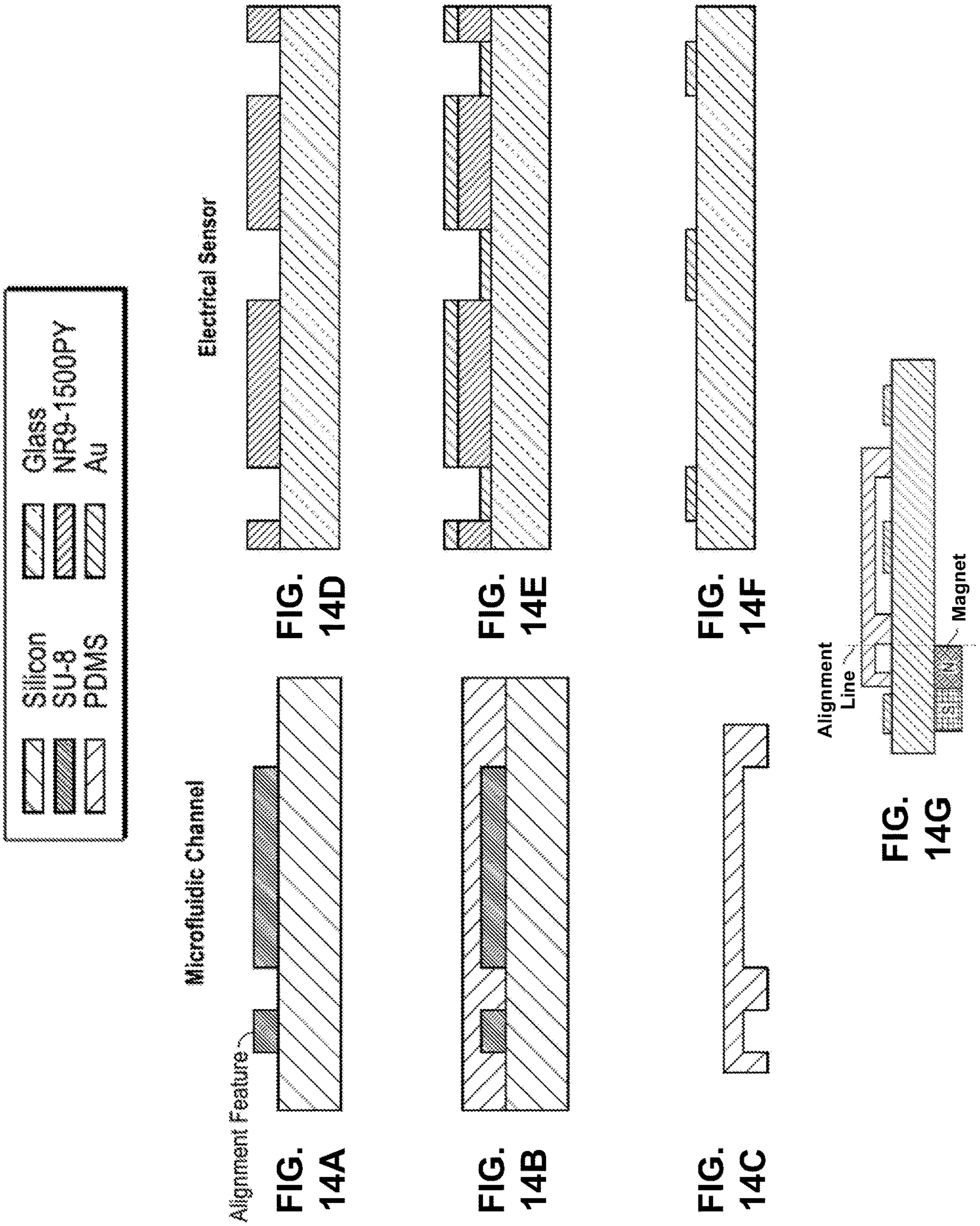
FIGS. 14A-G depict an exemplary manufacturing process for a microfluidic device, according to some embodiments of the present disclosure.

FIGS. 14A-G depicts an exemplary manufacturing process for a microfluidic device 100, according to some embodiments of the present disclosure. In some embodiments, a fabricated device can comprise three parts: a microfluidic layer, a magnet layer, and a glass substrate layer with a sensor-electrode pattern. The microfluidic layer used in testing was fabricated out of a polydimethylsiloxane (PDMS) layer using soft-lithography. In this process, a 4-inch silicon wafer was coated with 35 μm-thick SU-8 photoresist to create the mold (FIG. 14A). The microfluidic features were patterned on the photoresist using conventional photolithography. The mold wafer was then treated with trichloro(octyl)silane for 8 hours for effortless detachment of cured PDMS from the mold. PDMS prepolymer and crosslinker were mixed at a ratio of 10:1 and poured on the mold, degassed in a vacuum chamber, and then cured for four hours at 65° C. (FIG. 14B). Finally, cured PDMS was peeled off from the mold and diced into individual devices (FIG. 14C). The electrical sensor network was fabricated using a lift-off process. A 1-inch by 3-inch soda-lime glass slide was coated with 1.5 μm-thick negative photoresist (FIG. 14D). The sensor electrode pattern was transferred onto the photoresist layer with a maskless aligner and subsequent developing of the exposed photoresist. A 500 nm-thick Cr/Au film stack was deposited onto the substrate using an e-beam evaporator (FIGS. 14E-14F). The micromachined glass substrate and the PDMS microfluidic layer were surface-activated in oxygen plasma, aligned under a microscope, and permanently bonded on a hot plate at 65° C. to create the microfluidic device. Next, a neodymium permanent magnet was placed under the glass substrate and precisely aligned to the lithographically-defined alignment features within the PDMS layer under a microscope. Once aligned, the magnet was fixed in position using epoxy (FIG. 14G). As will be appreciated, other methods of fabricating a microfluidic device can be implemented, and the above fabrication is merely exemplary. Additionally, the materials used were merely exemplary and other materials may be employed to fabricate the device, as will be appreciated.

To test the device with different cells having varying surface antigen expression, MCF-7, SK-BR-3 and MDA-MB-231 breast cancer cells were purchased and propagated according to the manufacturer's instructions. The cells were cultured in the Dulbecco's Modified Eagle's Medium (DMEM) with 10% fetal bovine serum and 1% penicillin/streptomycin in 5% CO2 atmosphere at 37° C. in an incubator. Once the cells reached 80% confluence, they were detached from the culture flask using 0.25% trypsin-EDTA for 3 minutes. Subsequently, cells were pelleted, the supernatant was removed, and the cells were resuspended in 1X phosphate buffered saline (PBS) solution for immunomagnetic labeling and other protocols.

To compare results from the exemplary microfluidic device against the gold standard, flow cytometry, cells were both fluorescently marked and quantitatively analyzed with a flow cytometer. MCF-7 and MDA-MB-231 cells were stained with orange CMRA cell tracker and green CMDFA cell tracker, respectively. Twenty micrograms of the cell tracker was dissolved in dimethyl sulfoxide (DMSO) to the final concentration of 10 mM. The solution was then diluted to 5 μM by addition of serum-free DMEM media. The culture media was replaced with 4 mL of the prepared staining solution and cells were incubated in 5% CO2 atmosphere at 37° C. for 30 min. Following confirmation of successful labeling with a microscope, cells were washed with 1×PBS.

For magnetic labeling of cells to be analyzed in the exemplary microfluidic device, one-micron-diameter streptavidin-coated magnetic beads were used. First, 12 μL of stock bead solution (at a concentration of ~7-10×$10^9$ beads/mL in phosphate buffered saline (PBS) at pH 7.4 with 0.01% Tween-20, and 0.09% sodium azide) was used to pellet and resuspend magnetic beads in 1×PBS. Then, magnetic beads were conjugated with 10 μL of monoclonal biotin-conjugated Anti-EpCAM antibody at 4° C. for 15 min. Functionalized beads were pelleted using an external magnet and washed with 0.1% Bovine Serum Albumin (BSA) and 1% Tween-20 solution to minimize non-specific binding. The sample was then mixed with antibody-conjugated beads at a ratio of 300 beads/cell and incubated on a rocker for 45 minutes at room temperature.

Quantitative fluorescent measurements of EpCAM expression on MCF-7, SK-BR-3, and MDA-MB-231 cells were performed with a commercially-available flow cytometer for independent cell characterization for data validation and benchmarking of the exemplary microfluidic device. All three cell lines were labeled with phycoerythrin-conjugated EpCAM antibody from the same clone used in magnetic labeling by following the manufacturer's protocol. At least 3000 events were recorded for each analysis. The flow cytometry data were analyzed in FlowJo software (FlowJo, LLC) and exported to MATLAB (MathWorks) for further data analysis and visual representation.

Prior to experiments, microfluidic devices were incubated with 0.1% BSA and 1% Tween-20 solution for 1 hour at 4° C. to minimize non-specific binding of cells to the device. This step may help to prevent free magnetic beads in the sample from accumulating in the device and hindering the sample flow and magnetic manipulation of cells. During processing, the sample was loaded into a sealed 10 ml laboratory tube and was pneumatically driven through the device using a software-controlled pressure regulator. For electrical measurements, the device was driven by a 500 kHz sine wave, and the resulting signal amplitude was measured with a lock-in amplifier. Briefly, electrical current signals from positive and negative sensing electrodes were first converted into voltage signals using transimpedance amplifiers and were subtracted from each other using a differential amplifier. The amplitude of the differential signal was sampled from the output of the lock-in amplifier into a computer for further analysis. Acquisition and processing of the electrical signals were achieved by custom-built software.

The data from the microfluidic device were sampled at 500 kHz using a data acquisition board and processed using custom-built software. The software was initially provided with the digital codes for all microfluidic bins and identified parts of the waveform that corresponded to individual sensor signals through correlation. By averaging a sufficient number (n>10) of signals, a template library specific to the device and sample can be created to accommodate device-to-device or sample-to-sample variations. Coincident cells (i.e., cells arriving concurrently to the same or different microfluidic bins) can be resolved through successive interference cancellation, as described herein. At the end of the decoding process, the software output the microfluidic bin identity and the size information corresponding to each cell sorted on the microfluidic device.

High-speed microscope images of sorted cells were recorded to validate the operation of magnetophoresis stage and the sensor network. Cells were imaged as they were processed on the chip using a high-speed camera attached to an inverted microscope. The data were used to optimize the sample flow speed and to validate the operation of the sensor network by comparing the electrical signals with the matching images of cells sorted into different microfluidic bins.

Design Results

Figure 15:
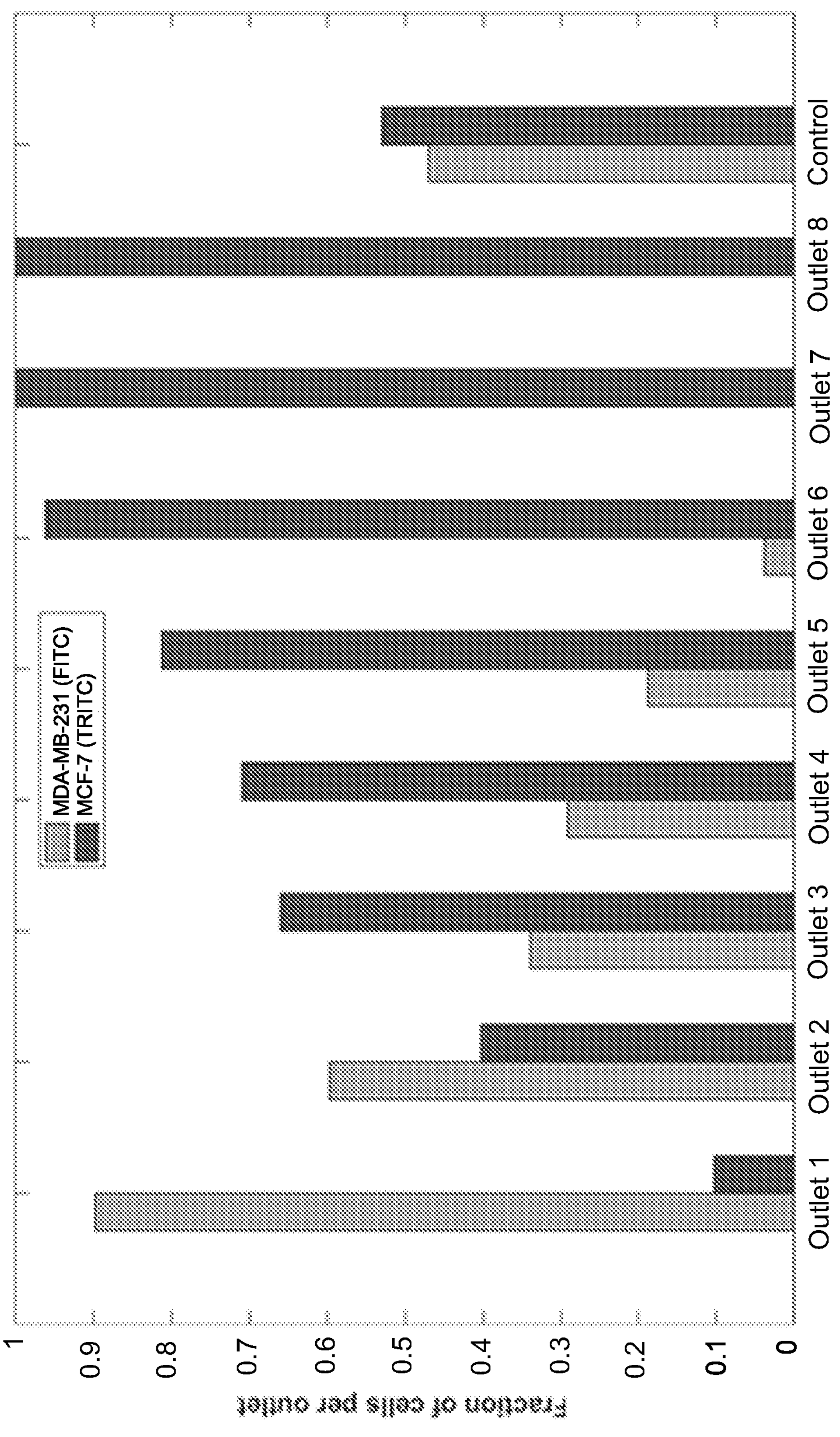
FIG. 15 is a graph depicting the fluorescent counting results of a cell mixture at each outlet of an exemplary 8-bin microfluidic device.
Figure 16:
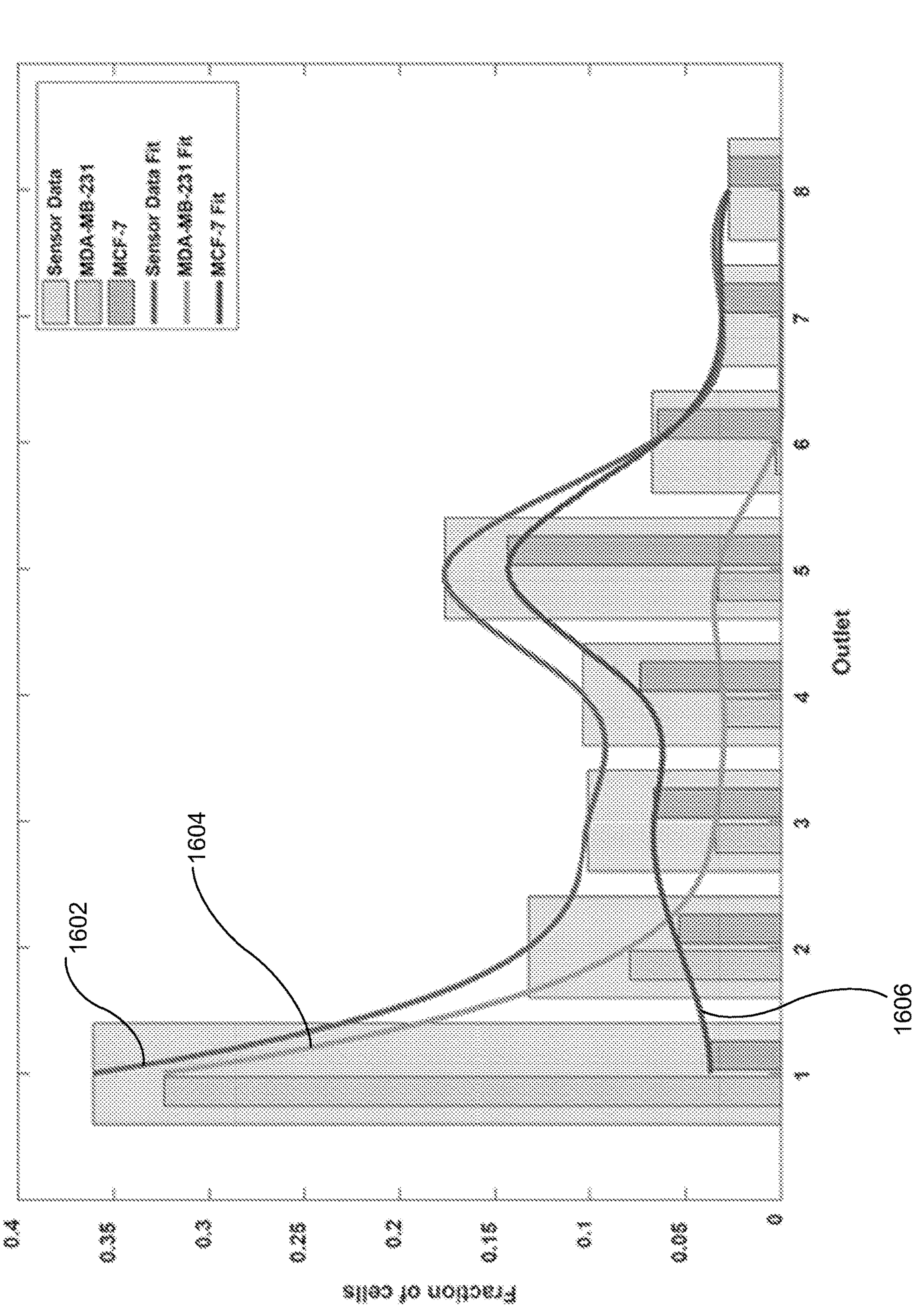
FIG. 16 is a graph depicting the results of the microfluidic device data as compared with fluorescent counting data for MDA-MB-231 and MCF-7 cell lines.
Figure 17A:
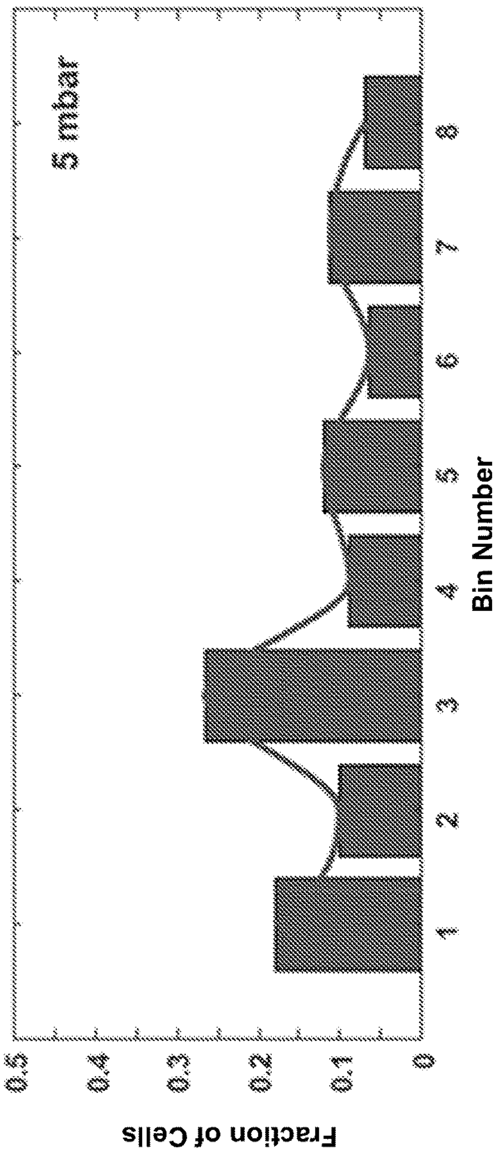
FIG. 17A is a graph depicting the distribution of SK-BR-3 breast cancer cells sorted to different microfluidic bins under 5 mbar drive pressure.
Figure 17B:
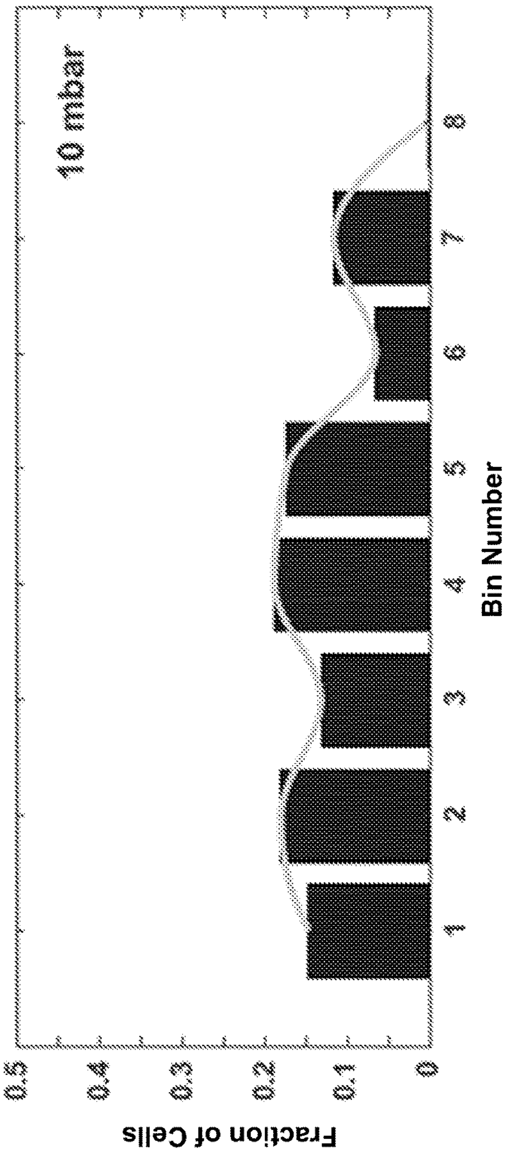
FIG. 17B is a graph depicting the distribution of SK-BR-3 breast cancer cells sorted to different microfluidic bins under 10 mbar drive pressure.
Figure 17C:
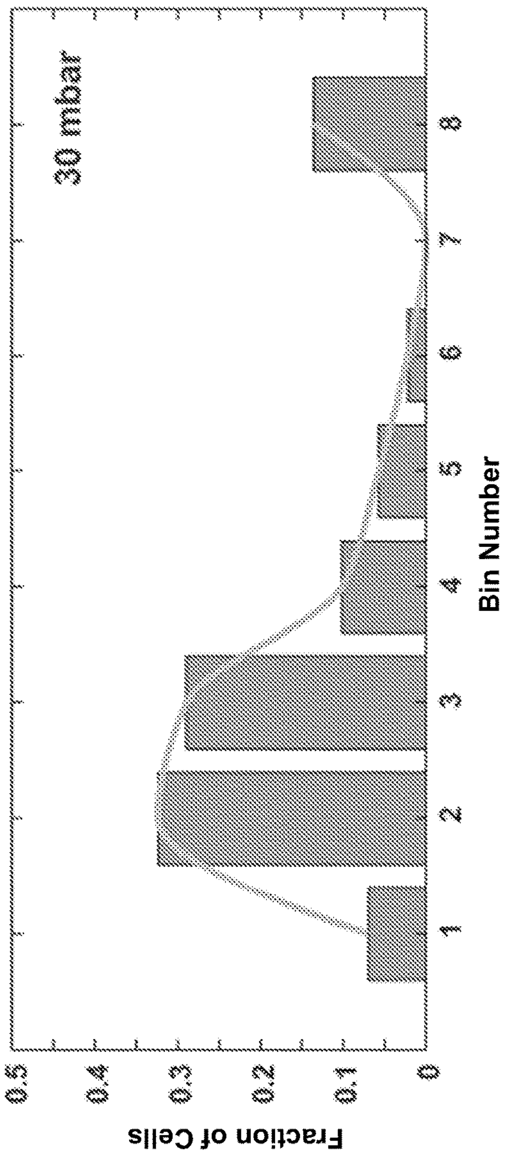
FIG. 17C is a graph depicting the distribution of SK-BR-3 breast cancer cells sorted to different microfluidic bins under 30 mbar drive pressure.
Figure 17D:
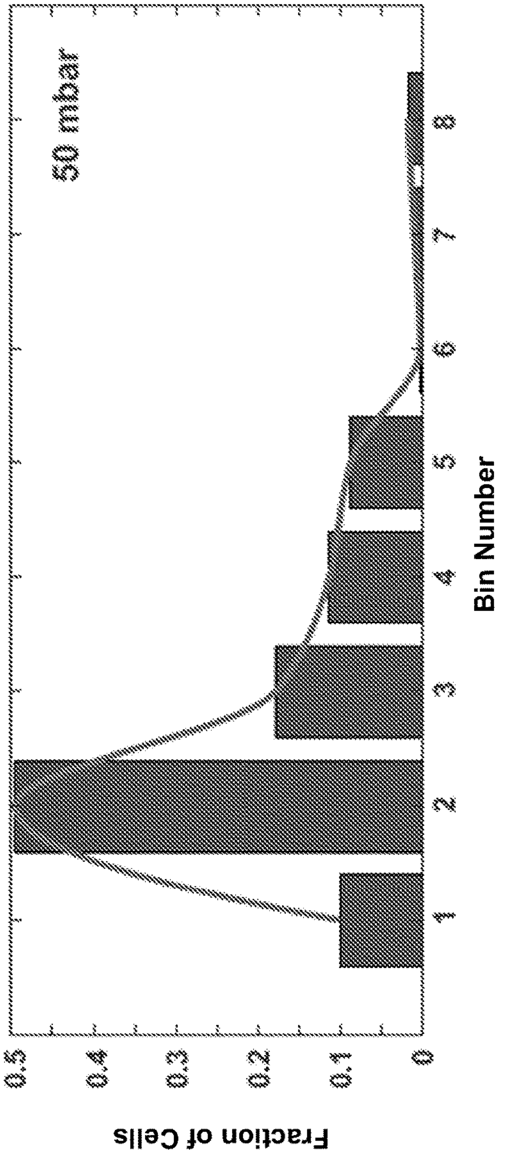
FIG. 17D is a graph depicting the distribution of SK-BR-3 breast cancer cells sorted to different microfluidic bins under 50 mbar drive pressure.
Figure 18A:
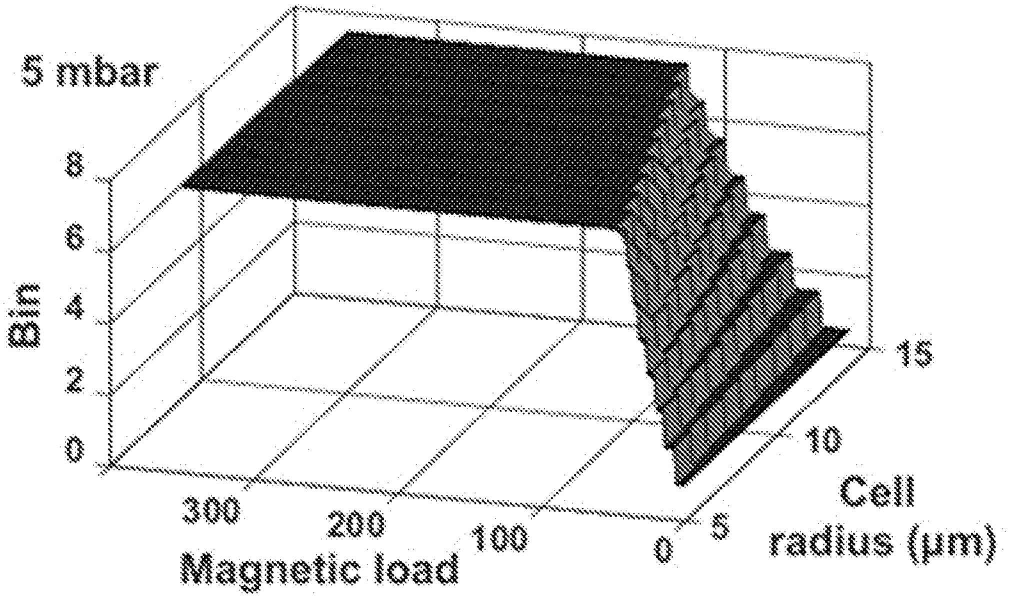
FIG. 18A depicts simulated microfluidic bin calibration curves for 5 mbar drive pressure.
Figure 18B:
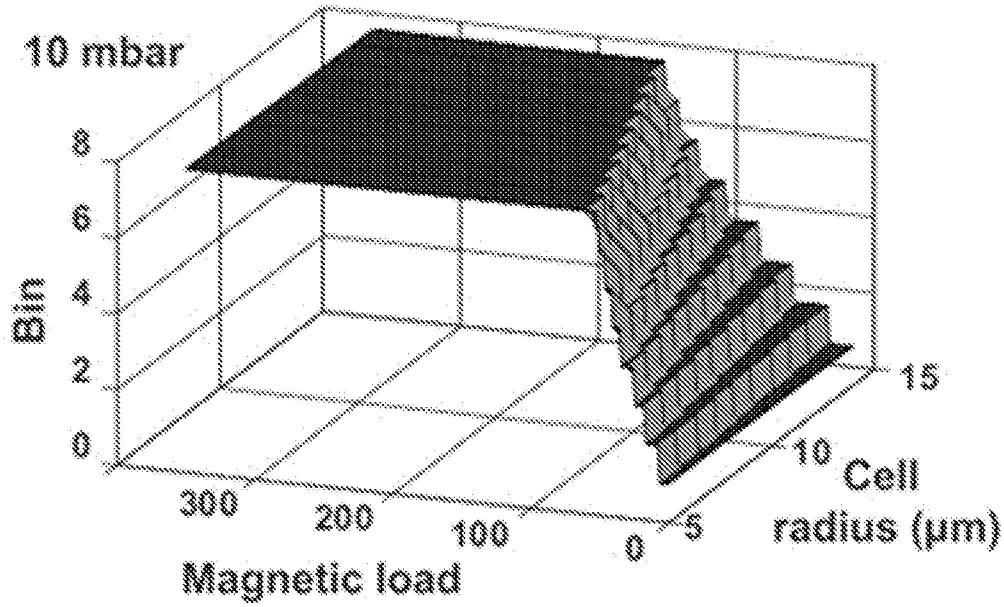
FIG. 18B depicts simulated microfluidic bin calibration curves for 10 mbar drive pressure.
Figure 18C:
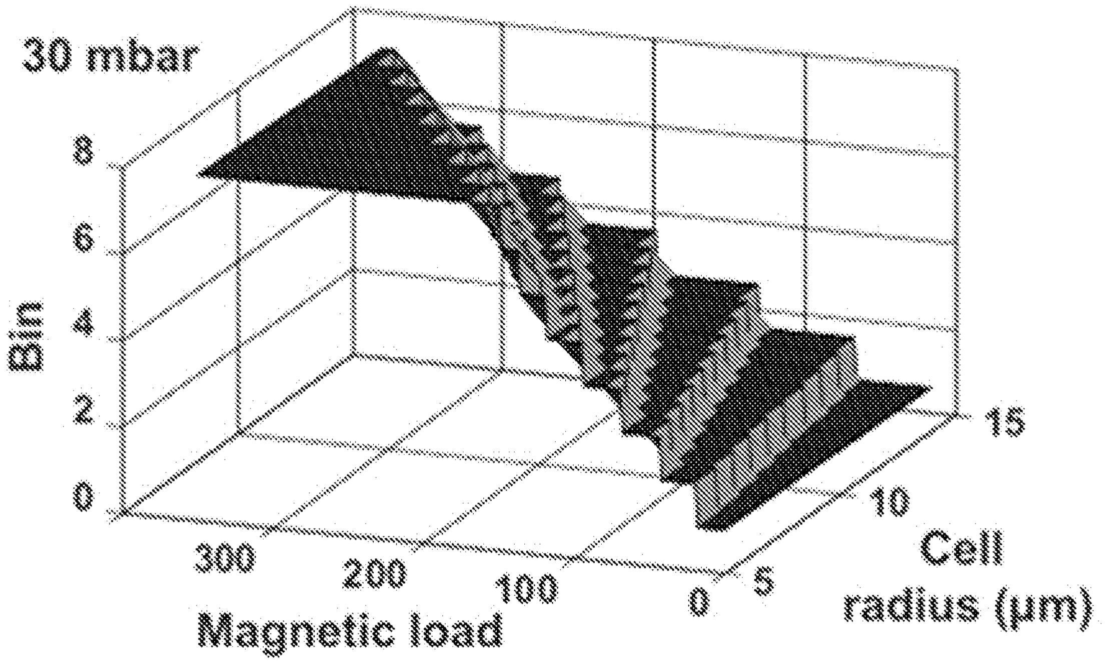
FIG. 18C depicts simulated microfluidic bin calibration curves for 30 mbar drive pressure.
Figure 18D:
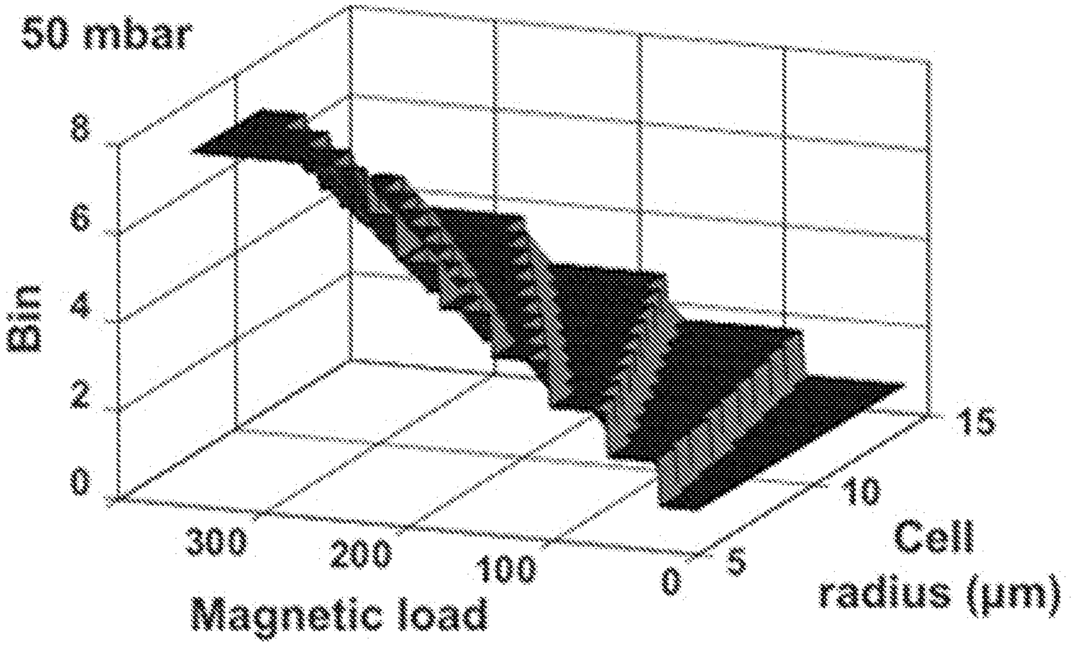
FIG. 18D depicts simulated microfluidic bin calibration curves for 50 mbar drive pressure.

Particle size is an important gating parameter for cell characterization and widely used in flow cytometry to distinguish different cell populations and to differentiate single cells from doublets. A 1:1 mixture of fluorescently- and magnetically-labeled MDA-MB-231 and MCF-7 cells was analyzed. Among the two, MCF-7 exhibits a higher EpCAM expression than MDA-MB-231. The mixture was driven into the device under 20 mbar constant pressure. Fluids at each bin of the microfluidic device were collected for fluorescent verification. FIG. 15 depicts the fluorescent counting results of the cell mixture at each outlet of an 8-bin device, where outlet 8 (or bin 8) was closest to the magnet. As expected, the presence of MDA-MB-231 cells diminishes, and MCF-7 cells gains the majority, in the bins closer to the magnet. FIG. 16 depicts the results of the microfluidic device data as compared with fluorescent counting data for both cell lines. The graph is in the form of a histogram of fraction of cells detected at each outlet. Fit line 1602 represents the sensor data fit, fit line 1604 represents the fluorescent data fit for MDA-MB-231, and fit line 1606 represents the fluorescent data fit for MCF-7. The distribution of cells obtained by fluorescent counting in FIG. 15 was applied to further obtain the expression profile of each cell lines. The results indicate that analysis of surface expression on a heterogeneous sample can be performed successfully by exemplary devices described herein.

Design Results for Dynamic Range

The dynamic range of the exemplary device was also tested by sweeping the sample flow rate during measurements, as described above. In doing so, one can vary the cell exposure time to the magnetic force field, thereby probing different ranges of expression levels within the cell population. To test the affect of flow rate on the dynamic range of the device, a sample of 2292 immunomagnetically labeled SK-BR-3 breast cancer cells were provided into an exemplary microfluidic device while varying the sample drive pressure between 5, 10, 30 and 50 mbar by a software-controlled pressure regulator.

FIGS. 17A-D are graphs depicting the distribution of SK-BR-3 breast cancer cells sorted to different microfluidic bins under different flow rates. In the exemplary microfluidic device, bin 1 is closest the cell inlet (i.e., inlet 102 of FIG. 1) and bin 8 is closest the magnet (i.e., magnet 110 of FIG. 1). As can be seen in the graphs, sensor data demonstrates a gradual shifting of cell populations from being sorted into microfluidic bins closer to the magnet to bins closer to the inlet as the flow rate increased, and eventually reaching an unsaturated state (at 50 mbar, shown in FIG. 17D), where most cells were collected in the five microfluidic bins closest to the inlet.

At low flow rates (i.e., 5 mbar in FIG. 17A, and 10 mbar in FIG. 17B), the sensor data significantly underrepresented the number of cells sorted into the most distant bin, likely because the majority of the cells directed to that bin were magnetically trapped on the sidewalls of the microfluidic chamber under low shear forces. While of practical concern, magnetic trapping of high-expressor cells at low flow rates did not affect the data analysis as low flow rates were exclusively used to discriminate low-expressor cells.

To calculate the magnetic bead distribution over the cell population, the aggregate sensor data was processed through a look-up table, which was constructed by simulating cell magnetophoresis at different flow rates using the computational model introduced above in the discussion accompany FIGS. 6-11F. In some embodiments, a look-up table may not only predict the number of magnetic beads on a cell from (1) the microfluidic bin the cell was sorted into, (2) its measured size and (3) the drive pressure, but may also reveal the parameter locus optimal for the estimation of magnetic bead counts for different expression levels. FIGS. 18A-D depict simulated microfluidic bin calibration curves for different flow rates. At low flow rates, low expressor cells can be discriminated by sorting them into different bins, whereas higher flow rates discriminate over a wider range of expression levels. The flat part in each plot represents the saturation of the sensor at that flow rate.

Figure 19:
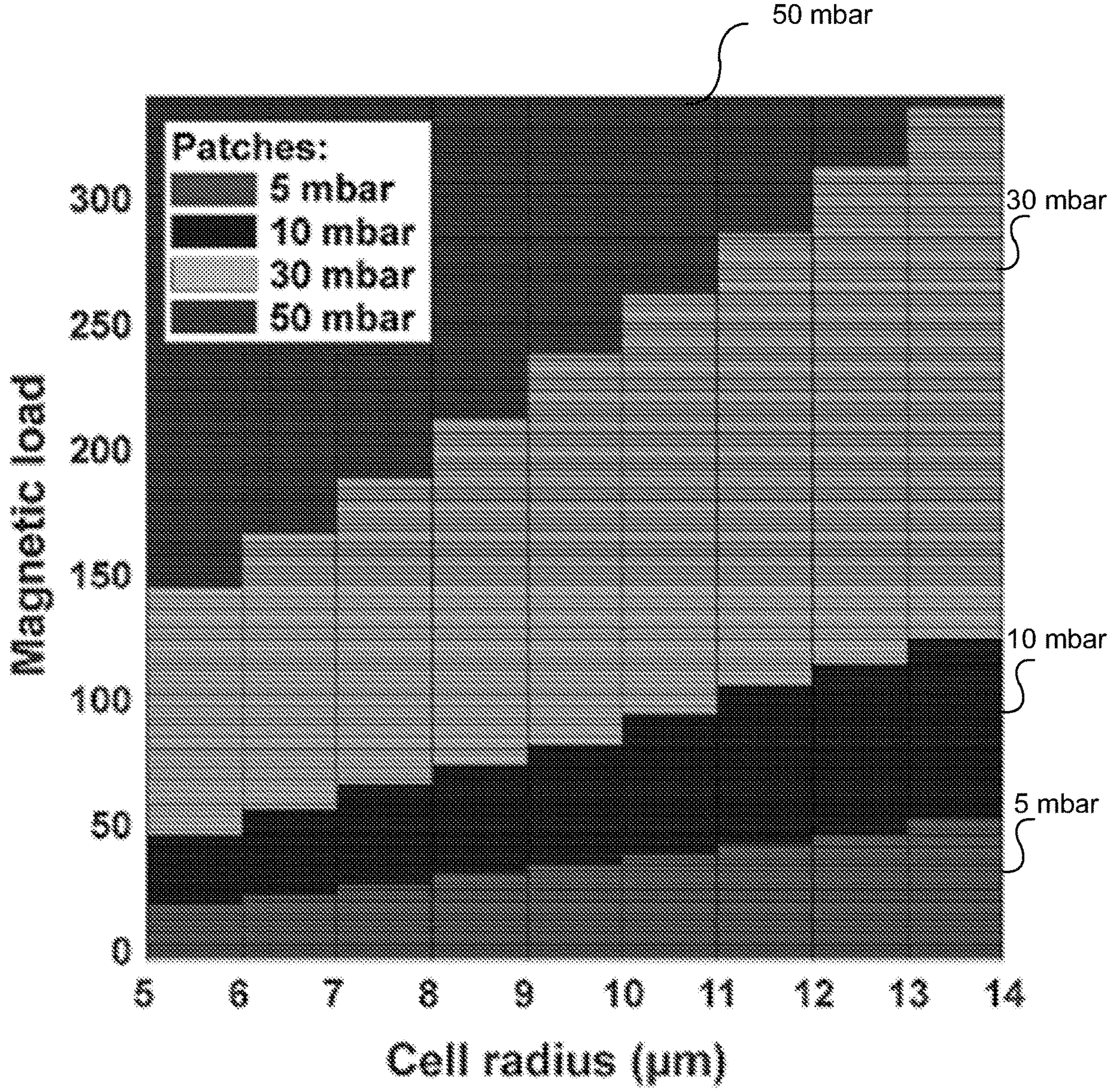
FIG. 19 is an exemplary expression histogram representing magnetic loads at different cell radii and at different flow rates.
Figure 20:
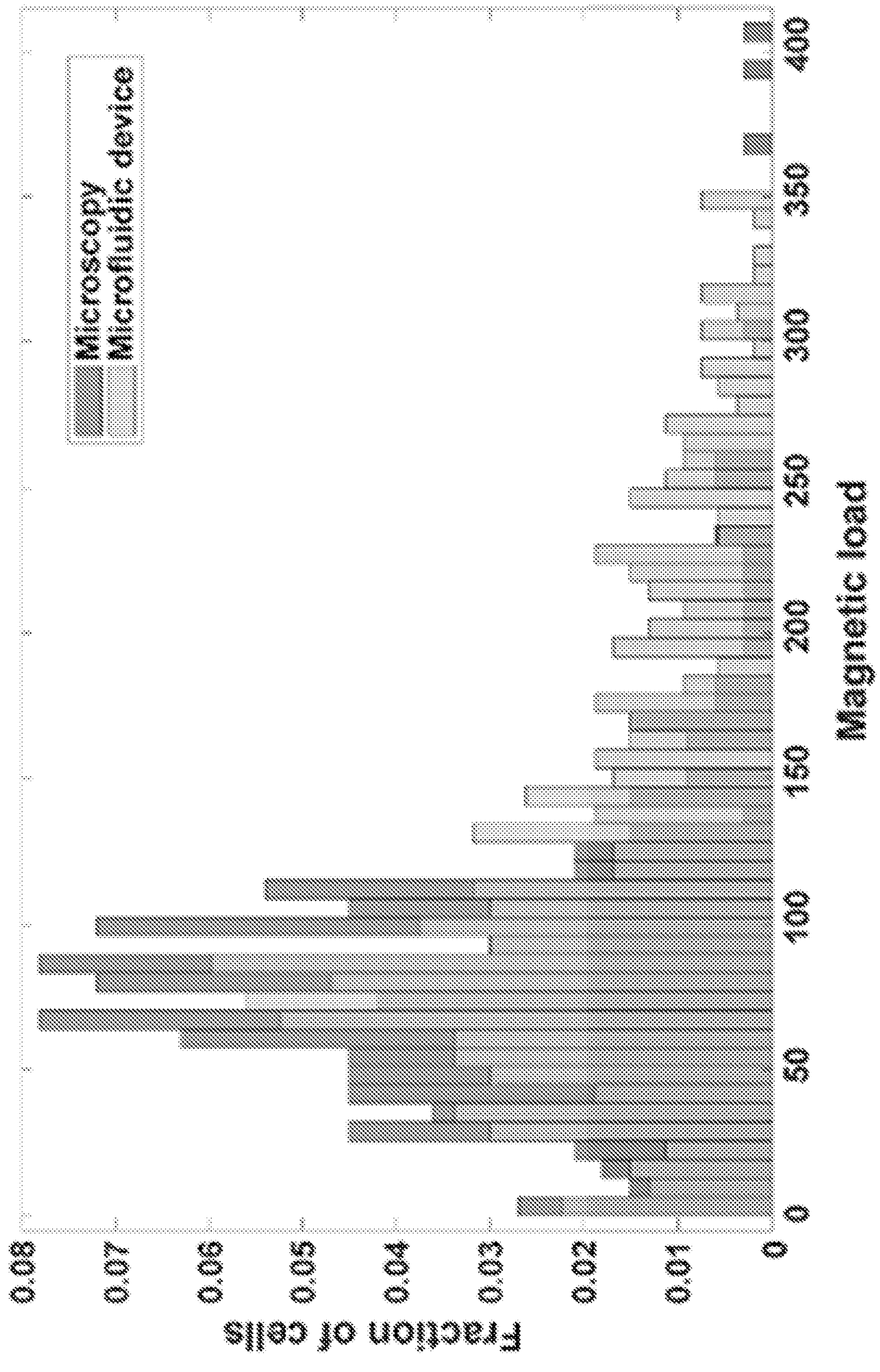
FIG. 20 is a graph comparing magnetic load measured by microscopy with the measurements from an exemplary microfluidic device.

By considering exclusively the data from the flow rate that provides the highest resolution for a given magnetic load range, an expression histogram can be constructed. FIG. 19 is an exemplary expression histogram representing magnetic loads at different cell radii and at different flow rates. As can be seen in the figure, a resultant magnetic load histogram can exhibit a dynamic range higher than any of the flow rates could provide alone. FIG. 20 is a graph comparing magnetic load measured by microscopy with the measurements from an exemplary microfluidic device. By modulating the flow rate during sample processing, a higher dynamic range can be achieved from the device that would otherwise provide a 3-bit (8 bins) dynamic range. This approach, therefore, may not only increase the dynamic range of a device (for example from 8 bins (3-bit)), but may also increase the resolution due to integrated size correction.

Figure 21:
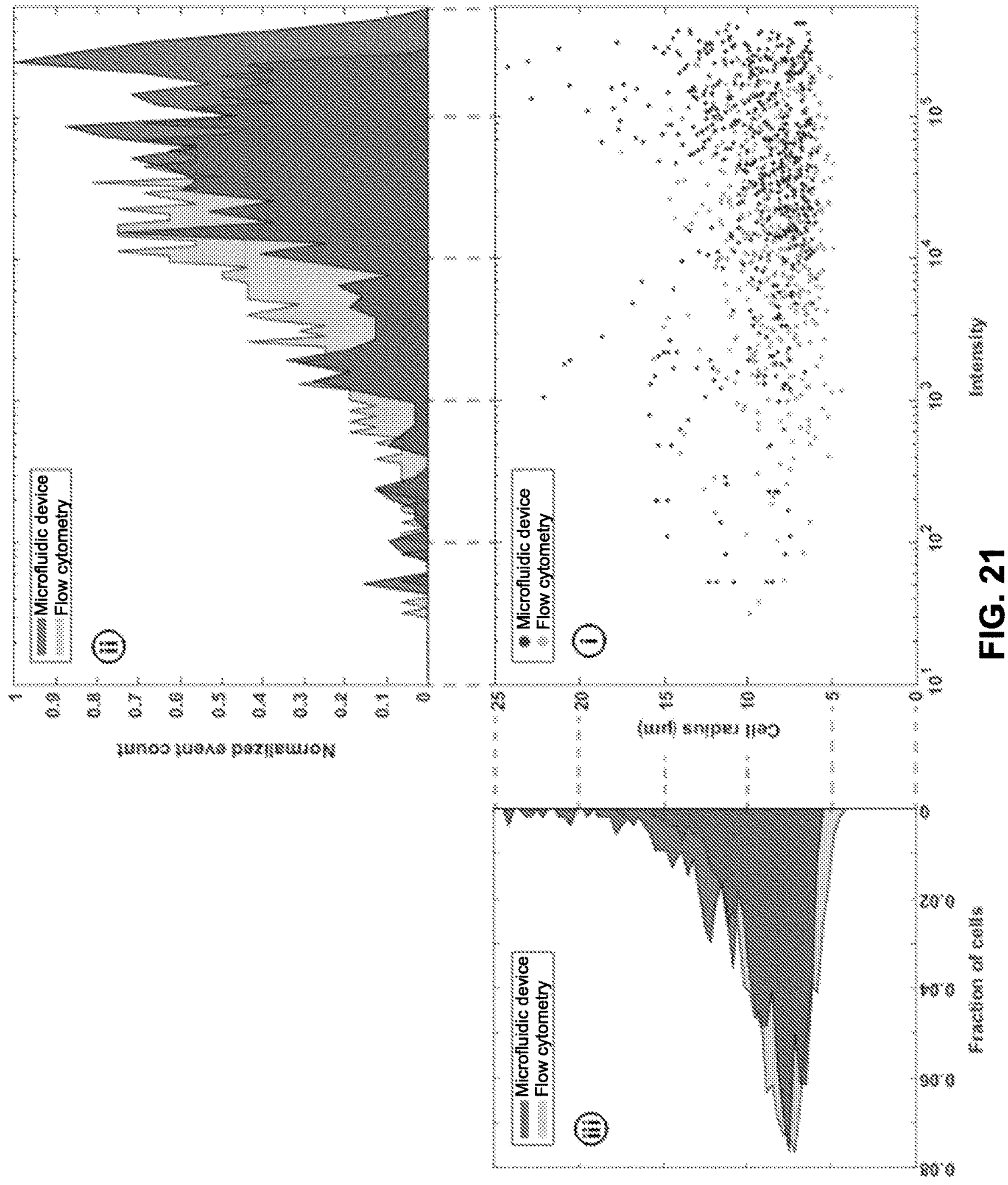
FIG. 21 is a graph of the comparison of the experimental results from an exemplary microfluidic device and from flow cytometry.

The ability of an exemplary microfluidic device to sort and analyze cells was also compared against the results from a commercial flow cytometer. SK-BR-3 cells were labeled with phycoerythrin-conjugated EpCAM antibody, as described herein. Matched samples of SK-BR-3 cells were processed with the exemplary microfluidic device and the commercial flow cytometer, and the results were compared for EpCAM expression. FIG. 21 is a graph of the comparison of the experimental results from an exemplary microfluidic device and from flow cytometry. Subgraph (i) is a scatter plat of cell size vs surface expression from 542 SK-BR-3 cells, subgraph (ii) is a histogram of the surface expression distribution normalized to the event counts, and subgraph (iii) is a histogram of the size distribution. From the analysis of 2292 cells on the microfluidic device, the results indicate a high-dynamic-range magnetic load distribution with a mean and standard deviation of 124.1 beads and 79.3 beads, respectively. In contrast, calibrated fluorescence measurements estimated a lower magnetic load with an average of 84.3 beads and a standard deviation of 49.7 beads. The mismatch between the two measurements is mainly due to the underestimation of the total number of magnetic beads (mean bead count is 90.2) on cells with brightfield microscopy, which was used to calibrate the fluorescence data. Otherwise, the two distributions match closely with coefficients of variation of 0.64 and 0.59 for the microfluidic device and commercial flow cytometer, respectively. As for the cell size measurement, the results show a 9.85 μm mean radius and 3.28 μm for standard deviation and match with the flow cytometry data of 8.45 μm mean radius and 2.11 μm for standard deviation.

Example Use Cases

The presently described systems and methods provide a novel platform for analyzing surface antigen expression for a sample of cells. The platform also provides a mechanism for quantifying cell size, thereby providing more data on the sample. In some embodiments, the platform also provides a mechanism to sort cells based on expression or size without the need for a separate gating process or manual separation. In this regard, the systems and methods described herein provide the benefits of magnetic-activated cell sorting, in that targeted cells (magnetically-labeled cells) can be separate from a fluid. The device, however, also provides benefits of fluorescence-activated cell sorting without the high cost, operational complexity, and bulky instrumentation of the method.

It is contemplated that the microfluidic devices described herein can also be converted to a handheld platform for point-of-care. The device can be converted to a highly portable handheld instrument with integrated electronics and disposable cartridges, eventually creating a point-of-care device for surface expression analysis. Cell membrane antigens are commonly used as diagnostic and prognostic biomarkers in medical applications and as therapeutic targets in drug delivery. The systems and methods described herein allow electrical profiling of antigen expression in a sample using an integrated, yet inexpensive, platform that integrates sample manipulation into the cytometry process, opening a path for direct expression profiling from unprocessed samples. Ability to perform cytometry beyond centralized laboratories can truly impact biomedical testing at the point of care especially for diagnosis of infectious diseases in resource-limited settings.

Figure 22:
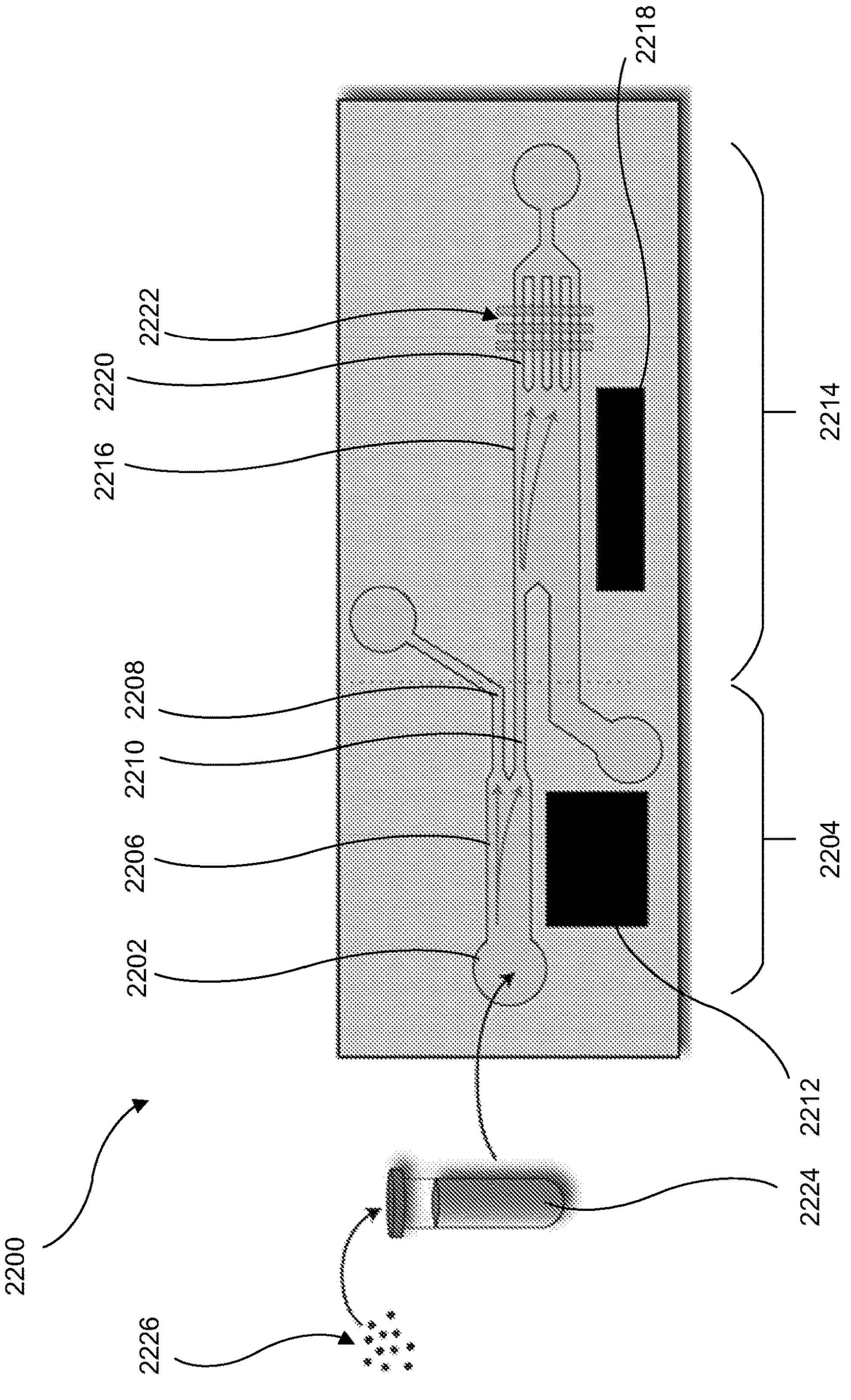
FIG. 22 depicts an exemplary multi-step process of separating and analyzing targeted cells, according to some embodiments of the present disclosure.

It is also contemplated that the present platforms could also remove targeted cells from untargeted cells in a multi-step process. FIG. 22 depicts an exemplary multi-step process of separating targeted cells from untargeted cells and then analyzing the remaining targeted cells, in accordance with some embodiments of the present disclosure. A separation device 2200 may comprise a sample inlet 2202 for receiving a sample of fluid with targeted and non-targeted cells. In a first stage 2204, the mixture of targeted and non-targeted cells may flow through a first flow chamber 2206. At the end of the first flow chamber 2206, and distal the sample inlet 2202, the separation device 2200 may comprise a removal channel 2208 and a fluid outlet 2210. A first magnet 2212 may be disposed adjacent to the first flow chamber 2206. The first magnet 2212 may be a high-gradient magnet such that the targeted cells are attracted to the fluid outlet 2210, and the non-targeted cells are not deflected and travel to the removal channel 2208. The non-targeted cells can be removed from the system at the removal channel 2208. At a second stage 2214, the fluid outlet 2210 may exit into a second flow chamber 2216. The second stage 2214 can be substantially similar to the processes described for the microfluidic device 100 of FIGS. 1-3A. In other words, the targeted cells may enter the second flow chamber 2216, be deflected by a second magnet 2218, and travel to a plurality of bins 2220. Each bin 2220 may include a sensor 2222 to detect the antigen expression and/or size of the cells, as described herein. In other embodiments, additional stages could be present to further isolate targeted cells from non-targeted cells. For example, the first stage 2204 may be repeated two or more times prior to the fluid entering the second stage 2214, thereby further enriching the sample that enters into the analysis stage (i.e., second stage 2214).

It is contemplated a separation device 2200 could be used to provide a method for analyzing surface antigen expression in whole blood. For example, a whole blood sample 2224 could be provided. Functionalized magnetic particles 2226 could be combined with the whole blood sample 2224. This mixtures could then be delivered into the sample inlet 2202 and proceed through the processes described above. The analysis of the targeted cells in the blood could then be analyzed by the sensor network described herein.

Figure 23:
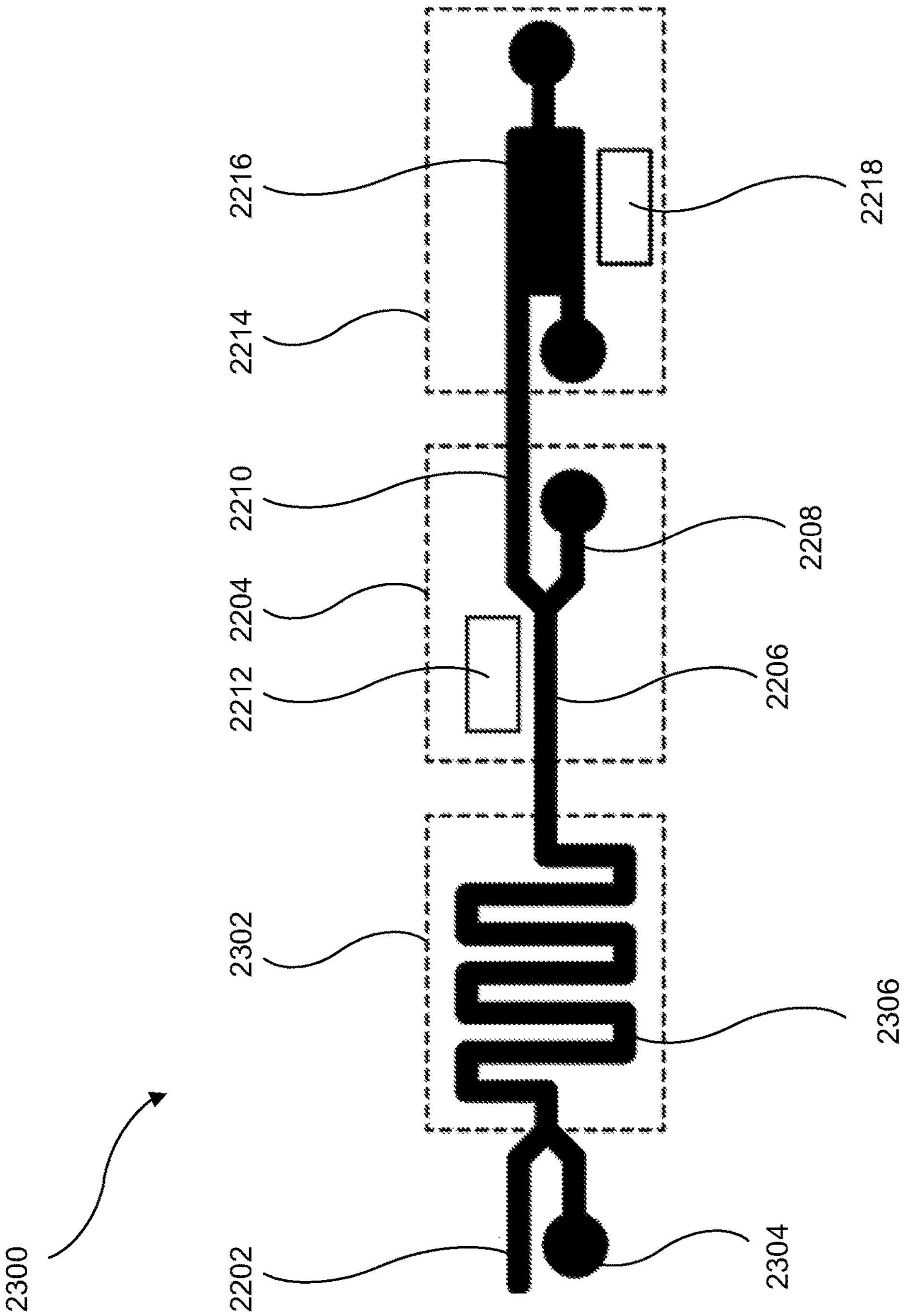
FIG. 23 depicts an exemplary multi-step process for labeling, enriching, and analyzing cell samples, according to some embodiments of the present disclosure.

FIG. 23 depicts an exemplary multi-step process for labeling, enriching, and analyzing cell samples, in accordance with some embodiments of the present disclosure. Similar to the embodiments described above for the separation device 2200 of FIG. 22, it is contemplated that a separation device 2300 may also include a cell-preparation stage 2302. In some embodiments, a separation device 2300 may comprise a sample inlet 2202 and a label reservoir 2304. In this embodiment, non-labeled cells may be provided in the sample inlet 2202, and at a cell-preparation stage 2302, functionalized magnetic particles 2226 can combine with the non-labeled cells in mixing channels 2306. After exiting the mixing channels 2306, the cellular sample can proceed to an enrichment stage (i.e., first stage 2014 of FIG. 22), and then proceed to an analysis stage (i.e., second stage 2214 of FIG. 22).

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A microfluidic device comprising:

a first inlet configured to receive a first fluid comprising magnetically-labeled cells having:
  a range of magnetic loads; and
  upstream flow trajectories;

a first flow chamber having a first end and a second end, the first end in fluidic communication with the first inlet;

a first magnet in magnetic communication with the first flow chamber and configured to deflect the magnetically-labeled cells from the upstream flow trajectories to downstream magnetophoretic trajectories;

bins, a respective bin of the bins associated with a respective downstream magnetophoretic trajectory of the downstream magnetophoretic trajectories, each bin having a first end and a second end, the first end of each bin in fluidic communication with the second end of the first flow chamber; and sensors, a respective sensor of the sensors disposed at the second end of a respective bin of the bins, each sensor configured to produce a unique signal in response to a cell of the magnetically-labeled cells passing through the respective bin associated with the respective sensor;

wherein the microfluidic device is configured to:
  sort the magnetically-labeled cells via differential deflection into a respective bin associated with a respective downstream magnetophoretic trajectory as the magnetically-labeled cells traverse the first flow chamber, different downstream magnetophoretic trajectories based, at least in part, on different magnetic loads of the magnetically-labeled cells;
  quantify sorted fractions of the magnetically-labeled cells by inline quantification of the magnetically-labeled cells received by each bin via a multiplexed array of the sensors; and
  analyze the magnetically-labeled cells using the unique signals of the sensors; and wherein the sorting or quantifying is based on magnetic loading of the magnetically-labeled cells, size of the magnetically-labeled cells, surface antigen expression of the antigen of interest, a flow rate of the first fluid, or a combination thereof.

2. The microfluidic device of claim 1 further comprising:

a second flow chamber disposed between the first inlet and the first flow chamber, the second flow chamber comprising a first outlet and a second outlet, the first outlet exiting into the first flow chamber, and the second outlet not exiting into the first flow chamber;

a second magnet disposed adjacent to the second flow chamber between the first inlet and the first and second outlets of the second flow chamber; and a controller configured to adjust a magnetic flux of the first magnet comprising an electromagnet to alter an amount of attraction of the magnetically-labeled cells by the electromagnet.

3. The microfluidic device of claim 2, wherein first fluid further comprises non-labeled cells; and wherein the second magnet is configured to separate the magnetically-labeled cells from the non-labeled cells by diverting the magnetically-labeled cells to the first outlet of the second flow chamber.

4. The microfluidic device of claim 1, wherein the magnetically-labeled cells comprise cells labeled with antibody-conjugated magnetic beads against a cell membrane antigen of interest.

5. The microfluidic device of claim 4, wherein:

each sensor:
  is configured to detect the magnetism of the magnetically-labeled cells;
  is coded with a multi-bit Gold sequence to produce the unique signal; and
  comprises at least one positive electrode finger and at least one negative electrode finger;

the microfluidic device further comprises:
  a positive electrode in electrical communication with the positive electrode fingers; and
  a negative electrode in electrical communication with the negative electrode fingers; and bits of the multi-bit Gold sequence of each sensor are defined by alternating the at least one positive electrode finger and the at least one negative electrode finger.

6. The microfluidic device of claim 5, wherein the multi-bit Gold sequence comprises at least 10 bits.

7. The microfluidic device of claim 6, wherein the unique signal of each sensor includes an amplitude corresponding to the size of the magnetically-labeled cells.

8. The microfluidic device of claim 6, wherein the unique signal of each sensor includes a signal duration corresponding to the flow rate of the first fluid.

9. The microfluidic device of claim 6 further comprising a second inlet configured to receive a second fluid, the second inlet in fluidic communication with the first end of the first flow chamber.

10. A microfluidic system comprising:

a first fluid comprising magnetically-labeled cells and non-labeled cells;

a first inlet to receive the first fluid;

a first flow chamber having a first outlet and a second outlet, the first outlet exiting to a second flow chamber, and the second outlet exiting to a removal channel;

a first magnet disposed adjacent to the first flow chamber, the first magnet separating the magnetically-labeled cells of the first fluid from the non-labeled cells of the first fluid by diverting the magnetically-labeled cells to the first outlet;

a plurality of bins, each bin having a first end and a second end, the first end of each bin in fluidic communication with the second flow chamber and disposed distal from the first fluid inlet;

a second magnet disposed adjacent to the second flow chamber, the second magnet attracting the magnetically-labeled cells of the first fluid towards a bin of the plurality of bins; and a plurality of sensors, each sensor disposed at the second end of a corresponding bin of the plurality of bins, each sensor:

producing a unique signal in response to detecting a cell of the magnetically-labeled cells of the first fluid passing through the bin corresponding to the sensor; and detecting a magnetism of a cell of the magnetically-labeled cells;

wherein the microfluidic system:

sorts the magnetically-labeled cells into the bins via differential deflection into a respective bin associated with a respective downstream magnetophoretic trajectory as the magnetically-labeled cells traverse the first flow chamber, different downstream magnetophoretic trajectories based, at least in part, on different magnetic loads of the magnetically-labeled cells;

quantifies sorted fractions of the magnetically-labeled cells by inline quantification of the magnetically-labeled cells received by each bin via a multiplexed array of the sensors; and analyzes the magnetically-labeled cells;

wherein the sorting or quantifying is based on magnetic loading of the magnetically-labeled cells, size of the magnetically-labeled cells, surface antigen expression of the antigen of interest, a flow rate of the first fluid, or a combination thereof; and wherein each sensor is coded with a multi-bit Gold sequence to produce the unique signal.

11. The microfluidic system of claim 10, wherein each sensor comprises at least one positive electrode finger and at least one negative electrode finger;

wherein the microfluidic system further comprises:

a positive electrode in electrical communication with the plurality of positive electrode fingers; and a negative electrode in electrical communication with the plurality of negative electrode fingers; and wherein bits of the multi-bit Gold sequence of each sensor are defined by alternating the at least one positive electrode finger and the at least one negative electrode finger.

12. The microfluidic system of claim 11, wherein the multi-bit Gold sequence comprises at least 10 bits; and wherein the unique signal of each sensor includes at least one of:

an amplitude corresponding to a size of a cell of the plurality of magnetically-labeled cells; or a signal duration corresponding to a flow rate of the first fluid.

13. The microfluidic system of claim 12 further comprising a second inlet in fluidic communication with the second flow chamber and disposed proximate the first outlet, the second inlet configured to receive a second fluid.

14. The microfluidic system of claim 13, wherein at least one of the first magnet or the second magnet is an electromagnet; and wherein the microfluidic system further comprises a controller configured to adjust a magnetic flux of the electromagnet to alter an amount of attraction of the magnetically-labeled cells by the electromagnet.

15. A method for antigen expression analysis in whole blood, the method comprising:

combining functionalized magnetic particles with blood, wherein the functionalized magnetic particles create a plurality of targeted cells and non-targeted cells, the targeted cells being magnetically-labeled;

providing the microfluidic system of claim 10, wherein the blood is the first fluid;

delivering the blood and cells into the first inlet;

flowing the blood from the first inlet and through the first flow chamber to separate the targeted cells from the non-targeted cells;

flowing the blood from the first fluid outlet, through the second flow chamber, and through the plurality of bins; and receiving the unique signal from a sensor of the plurality of sensors.

16. The method for antigen expression analysis in whole blood of claim 15 further comprising:

receiving a plurality of unique signals from the plurality of sensors; and calculating cellular data for the plurality of targeted cells from the plurality of unique signals.

17. The method for antigen expression analysis in whole blood of claim 16, wherein the unique signal of each sensor includes one or both of:

an amplitude corresponding to a size of a targeted cell; and a signal duration corresponding to a flow rate of the blood.

18. The method for antigen expression analysis in whole blood of claim 17, wherein each sensor comprises at least one positive electrode finger and at least one negative electrode finger; and wherein the microfluidic system further comprises:

a positive electrode in electrical communication with the positive electrode fingers; and a negative electrode in electrical communication with the negative electrode fingers; and wherein bits of the multi-bit Gold sequence of each sensor are defined by alternating the at least one positive electrode finger and the at least one negative electrode finger.

19. The method for antigen expression analysis in whole blood of claim 18 further comprising adjusting a flow rate of the first fluid to change an amount of attraction of the targeted cells by the second magnet.

20. The method for antigen expression analysis in whole blood of claim 19, wherein at least one of the first magnet or the second magnet is an electromagnet;

wherein the microfluidic system further comprises a controller configured to adjust a magnetic flux of the electromagnet to alter an amount of attraction of the magnetically-labeled cells by the electromagnet; and wherein the method further comprises adjusting, via the controller, the magnetic flux of the electromagnet.

* * * * *